US007276310B2

(12) United States Patent
Kobayashi et al.

(10) Patent No.: US 7,276,310 B2
(45) Date of Patent: Oct. 2, 2007

(54) ELECTROLYTE MEMBRANE FOR A FUEL CELL, ELECTROLYTE MEMBRANE ELECTRODE ASSEMBLY FOR A FUEL CELL, AND A FUEL CELL

(75) Inventors: Susumu Kobayashi, Nara (JP);
Toshihiro Matsumoto, Osaka (JP);
Takeshi Tomizawa, Nara (JP);
Katsuzou Kokawa, Nara (JP);
Teruhisa Kanbara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 587 days.

(21) Appl. No.: 10/817,033

(22) Filed: Apr. 2, 2004

(65) Prior Publication Data

US 2004/0234831 A1    Nov. 25, 2004

(30) Foreign Application Priority Data

Apr. 2, 2003    (JP) .............................. 2003-099031

(51) Int. Cl.
*H01M 2/08*    (2006.01)
*H10M 8/02*    (2006.01)
(52) U.S. Cl. .............................. 429/35; 429/30; 429/38
(58) Field of Classification Search .................. 429/30, 429/35, 36, 38, 39
See application file for complete search history.

(56) References Cited

U.S. PATENT DOCUMENTS

| 4,988,583 | A | | 1/1991 | Watkins et al. | |
|---|---|---|---|---|---|
| 5,173,373 | A | * | 12/1992 | Ohsuga ........................ | 429/35 |
| 6,316,139 | B1 | | 11/2001 | Uchida et al. | |
| 6,794,078 | B1 | | 9/2004 | Tashiro et al. | |
| 6,811,915 | B2 | * | 11/2004 | Dristy et al. ................... | 429/35 |

| 2002/0068208 | A1 | 6/2002 | Dristy et al. |
|---|---|---|---|
| 2002/0150810 | A1 | 10/2002 | Mizuno |

FOREIGN PATENT DOCUMENTS

| CN | 2475144 Y | 1/2002 |
|---|---|---|
| DE | 10107790 A1 | 8/2002 |
| EP | 0918362 A2 | 5/1999 |
| EP | 0951086 A2 | 10/1999 |
| JP | 63021763 A | 1/1988 |
| JP | 63-212763 A | 9/1988 |
| JP | 08-045517 A | 2/1996 |
| JP | 09-063621 A | 3/1997 |

(Continued)

*Primary Examiner*—Stephen J. Kalafut
(74) *Attorney, Agent, or Firm*—Akin Gump Strauss Hauer & Feld LLP

(57)    ABSTRACT

A configuration of an electrolyte membrane for a fuel cell is provided, which can be sealed reliably and easily between the separators. The sealing configuration is between the separators and between a peripheral portion of the electrolyte membrane and the respective separators. The sealing configuration includes a frame having an elastic modulus of greater than about 2,000 MPa and less than about 2,000,000 MPa and an elastic body having an elastic modulus of greater than 0 MPa and less than about 200 MPa. In one embodiment, the separators or portions thereof may themselves constitute the at least one elastic body. In another embodiment, the electrolyte membrane may be held by two frames lying on opposite sides of the electrolyte membrane, with the at least one elastic body arranged between the first and second frames sandwiching the membrane and also between the frames and the respective separators.

18 Claims, 39 Drawing Sheets

FOREIGN PATENT DOCUMENTS

| | | |
|---|---|---|
| JP | 11-154522 A | 6/1999 |
| JP | 2000-182636 A | 6/2000 |
| JP | 2002-083614 A | 3/2002 |
| JP | 2002-203578 A | 7/2002 |
| JP | 2003-031237 A | 1/2003 |
| WO | WO92/22096 A2 | 12/1992 |
| WO | WO94/09520 A1 | 4/1994 |
| WO | 00/26979 A | 5/2000 |
| WO | 02/061869 A1 | 8/2002 |
| WO | WO-03/041205 A2 * | 5/2003 |
| WO | WO-2005/062407 A2 * | 7/2005 |

* cited by examiner

PRIOR ART

PRIOR ART

PRIOR ART

PRIOR ART

PRIOR ART

ELECTROLYTE MEMBRANE FOR A FUEL CELL, ELECTROLYTE MEMBRANE ELECTRODE ASSEMBLY FOR A FUEL CELL, AND A FUEL CELL

BACKGROUND OF THE INVENTION

The present invention relates to a configuration of the electrolyte membrane for a fuel cell; a configuration of the electrolyte membrane electrode assembly for the fuel cell in which the sealing configuration, arranged on the peripheral aspect of the electrolyte membrane for the fuel cell, has been particularly improved; and a fuel cell employing this improved configuration of the electrolyte membrane-conjugated electrodes.

The basic principle of the polymer electrolyte membrane type fuel cell is to remove the electricity from the reactive energy created by water synthesis through a chemical reaction via an ion exchange membrane, which is a polymer membrane, based on exposure of oxidation gas, such as air, on one side and fuel gas on the other side, respectively.

The generating element of the fuel cell is formed on both sides of the polymer electrolyte membrane, which selectively transports hydrogen, wherein the polymer electrolyte membrane is sandwiched between a pair of electrodes, each comprising a catalyst layer (anode catalyst layer and cathode catalyst layer, respectively) having a carbon powder carrying a platinum group metal catalyst as the main ingredient and a gas diffusion layer, which has both gas permeability and electron conductivity. This basic element for generating electrical energy is called the MEA (membrane-electrode-assembly). The circumference of each electrode is lined with gaskets, which surround the polymer electrolyte membrane on both sides to prevent leakage of fuel gas, which is supplied to one electrode, and oxidation gas supplied to the other, so as not to allow mixing of the two kinds of gases. These gaskets and the MEA are generally unified by a method of thermal compression bonding.

The basic configuration of this fuel cell is provided with gaskets and an MEA, which are interleaved between the anode separator, which has a fuel gas flow channel, and a cathode separator, which has an air flow channel.

Generally, each separator is provided with a pair (optionally multiple pairs) of penetrating holes (manifolds), which are designed for connecting the grooves on the separator plates directly to the ends of lines, which are used for supplying fuel gas, oxidation gas, and cooling water to each separator. This configuration allows, for example, fuel gas to be sent from the fuel gas supply manifold and divided among the fuel gas flow channels of the anode separators, where it is consumed in the process of the fuel gas flowing from the flow channels into the MEA cell reaction process. The excess fuel gas is disposed into a fuel gas exhaust manifold. The oxidation gas follows the same process. The fuel cell should be cooled with cooling water, etc. to maintain a preferred temperature, because of the heat that accompanies the generation of electrical energy. For this reason, a cooling member incorporating a cooling water flow channel is provided on the backside of one in every three cells. This MEA, the separator plates, and the cooling member are piled up one after another, and the assembly of unit fuel cells is fixed at both ends of this fuel cell stack, which is interleaved into end plates via a collector plate and an insulator and affixed with fastening bolts. The layered fuel cell is simply called a "stack".

FIG. 1 depicts a perspective view of a conventional fuel cell stack (partially exploded), and FIG. 2 is a cross sectional view along lines II-II in FIG. 1. Only part of the stack configuration is shown in FIGS. 1 and 2, for sake of clarity.

FIG. 3 shows in plan view one example of an air flow channel pattern of a cathode separator, which was provided in the conventional stack, and FIG. 4 shows in plan view one example of a hydrogen flow channel pattern on an anode separator, which was provided in the conventional stack. Additionally, FIG. 5 is a plan view, which shows an MEA and a gasket configuration that accommodates the cathode separator shown in FIG. 3 and the anode separator shown in FIG. 4. FIG. 6 is a cross sectional view along line V-V of FIG. 5.

As shown in FIGS. 1-10, hydrogen manifold 3, water manifold 4, and air manifold 5, are formed at both ends of the rectangular anode separators 1 and the cathode separators 2. The anode separator 1 and the cathode separator 2 are connected by pressure welding via O-ring 8 (water cooling surface sealing material). The water-cooling flow channel 9 is formed on one side of the anode separator 1, which connects with the cathode separator 2, and the cathode separator 2 connects with the anode separator 1, respectively. Additionally, airflow channel 10 located on the distal side of anode separator 1 from cathode separator 2, and the hydrogen flow channel 10 on the distal side of cathode separator 2 in relation to anode separator 1 are formed, respectively.

Exemplary patterns of this airflow channel 10 and the hydrogen flow pathway 11 are shown in FIGS. 3 and 4, respectively.

Referring to FIGS. 5 and 6, MEA 13 is arranged in a configuration having an ion exchange membrane 12, anode catalyst layer 13, and cathode catalyst layer 14, which are formed on either side of the ion exchange membrane 12, and gas diffusion layers 7. In the stack anode catalyst layer 13 and cathode catalyst layer 14 are interleaved between anode separator 1 and cathode separator 2. Gaskets 6 are provided to sandwich the outer edges of ion exchange membrane 12, around gas diffusion layers 7 for the hydrogen and air, which are supplied to gas diffusion layers 7, so as not to become mixed or leaked. As mentioned above, the MEA 15 and gaskets 6 may be unified by thermo-compression bonding.

As already mentioned, an important object of a gas seal in the fuel cell is to prevent gas cross leakage, which is more specifically a mixing phenomenon of fuel gas and oxidation gas that are mixed because of an imperfect seal. This phenomenon has a close relationship with the seal configuration of the fuel cell. When the flow channel has a meander shape with a direct connection to the manifold (see the example shown in Japanese Patent No. 2711018), the gasket located in the outer edge part of the MEA is supported on only one side of the separator with this flow channel part, as the configuration shows clearly. Consequently, a leakage route occurs in two places due to the gasket drooping down to the flow channel side of the electro-conductive separator plate located in or around the gas manifold. One path of leakage is the gasket, which is supported on one side, and which droops down to the flow channel of the separator. Consequently, space is created in the separator on the other side, which forms a leakage path. The other cause is the leakage path which is created by the separation of the membrane and the gasket, when the gasket is deformed as mentioned above, because the connecting strength of the gasket and the membrane is very weak. The usual membrane is made with denatured fluorinated resin, although the usual gasket is formed by attachment to the membrane.

This cross leakage is quite harmful to the function of the fuel cell. Considering the leakage of fuel gas into the oxidation gas manifold through the above-mentioned leakage path next to the manifold of one cell, all of the oxidation gas, which is supplied to all of the cells, includes fuel gas, because the gas manifold is shared by all of the cells according to the stacked configuration. Consequently, leakage not only causes a drastic decrease in voltage, but the polymer membrane becomes damaged because of catalytic combustion of fuel gas, which essentially should have been consumed by the fuel cell reaction with the oxidation gas on the air electrode side. As a result, destruction of the cell finally ensues, because both electrode gases become mixed through perforation of the cell membrane, which suffers severe damage.

Considering these circumstances, various kinds of cross leakage prevention methods have been devised. However, these devices were only designed with the shape of the separator side (see the example shown in Japanese unexamined patent publication, No 2002-203578).

FIG. 7 is a plan view showing a part of the conventional cathode separator configuration, which was devised as mentioned above, and FIG. 8 is a cross sectional view along the line VII-VII in FIG. 7. The method of construction, in which the gasket is supported by insertion into the hydrogen flow channel of a different piece for bridge part 11A, which is next to the hydrogen manifold 3 of the cathode separator 2 shown in FIGS. 7 and 8, is the simplest and most commonly used method.

The so-called submarine system (see the example shown in Japanese unexamined patent publication No. 2002-83614) is a related idea, as shown in FIGS. 9 and 10, which provides full support for the gaskets in the proximity of the manifold by providing a gas channel from each backside of the cell utilizing a water cooling phase of the separator.

There are many proposals designed to prevent cross leakage using a single material for the gasket-sealing configuration (see the examples shown in Japanese published patent applications Nos. HEI7-501417, HEI8-45517, and HEI8-507403).

The method of construction which is illustrated in FIGS. 7 and 8 requires two arrangements on both the fuel gas side and the oxidation gas side. Consequently, from the viewpoint of accuracy and the difficulties associated with carrying out the complex assembly itself, it is hard to consider this construction for mass production of a polymer membrane type fuel cell, which requires the buildup of hundreds of cells in a stack.

Although the above-mentioned submarine method has an excellent design to eradicate cross leakage, it does create the problem of volume increase (causing a decrease in the electric density). Thus, it absolutely must have one cooling surface per cell, because of the built-up configuration of the stack. It also poses difficulties in cost reduction, because a low cost molded separator cannot be used. Thus, it is technically difficult to use a conventional molded separator with this kind of shape that is equipped with small perforations. Consequently, when the most common shaped separator is used, the gasket itself must have rigidity, resistance to bending, and sufficient elasticity to act as a sealant. However, the highly elastic material, which shows an excellent sealing effect, cannot resolve the above-mentioned problem of droopiness, because it performs with insufficient rigidity, and easily "creeps" because it lacks mechanical strength. Conversely, a material which demonstrates excellent accuracy in terms of dimension and mechanical characteristics, cannot be expected to have a sealing effect. In sum, the above-mentioned gasket-sealing configuration using a single material poses difficulties in usage.

BRIEF SUMMARY OF THE INVENTION

The present invention was developed, in view of the above-mentioned circumstances, with the purpose of offering: a configuration of the electrolyte membrane for a fuel cell, which can predictably and easily seal the space between the separators; a separator and a membrane for the fuel cell; a configuration of the membrane electrode assembly for the fuel cell; and a fuel cell which employs the above configuration of the membrane electrode assembly.

The present invention starts from the conventional arrangement of an electrolyte membrane element for use in a fuel cell in which the membrane is sandwiched between a pair of electrode layers to form a membrane electrode assembly (MEA), and the MEA is held tightly between a pair of separators, each having a gas flow channel facing the MEA. According to the present invention, the electrolyte membrane element comprises an electrolyte membrane having peripheral portions tightly held by a frame having an elastic modulus of greater than about 2,000 MPa and less than about 2,000,000 MPa and at least one elastic body having an elastic modulus of greater than 0 MPa and less than about 200 MPa. The frame and the elastic body are configured to provide fluid-tight seals between the membrane peripheral portions and the respective separators.

The invention also provides a membrane electrode assembly in which an area of the electrolyte membrane laterally surrounded by the frame is sandwiched between a pair of electrode layers. In one embodiment of the invention, the at least one elastic body is not attached to the frame.

According to another embodiment of the invention, the at least one elastic body is attached to the frame. Preferably, the frame and the at least one elastic body form a unit, and more preferably, the frame and the at least one elastic body are fusion bonded together. According to other preferred embodiments, the at least one elastic body may cover the entire surface of the frame, the frame may be anchored by the at least one elastic body, or the frame may have at least one undercut portion, wherein the at least one elastic body fills the undercut portion.

Another aspect of the invention is a fuel cell having a MEA as described above with a pair of electrode layers sandwiching an area of the electrolyte membrane laterally surrounded by a frame. A pair of separators each having a gas flow channel facing the membrane tightly holds the MEA therebetween, such that the frame and the at least one elastic body provide fluid-tight seals between the membrane and the respective separators. In this fuel cell, the frame and the at least one elastic body may be arranged or cooperate in any of the preferred manners mentioned above.

In a further aspect of the present invention, the frame holding the peripheral portions of the electrolyte membrane of the fuel cell has an elastic modulus of greater than about 200 MPa and less than about 2,000,000 MPa. A pair of electrode layers sandwiches an area of the electrolyte membrane laterally surrounded by the frame completes the MBA, and a pair of separators, each having a gas flow channel facing the membrane, tightly holds the MEA therebetween. At least portions of the separators have an elastic modulus greater than 0 MPa and less-than about 200 MPa, such that the frame and the separators are configured to provide fluid-tight seals between the membrane peripheral portions and the respective separators.

In another embodiment according to the present invention, the fluid-tight seals between the membrane peripheral portions and the respective separators of a fuel cell having an MEA tightly held between the pair of separators, are provided by a seal configuration comprising first and second frames having an elastic modulus greater than 2,000 MPa and less than 2,000,000 MPa. The first and second frames lie on opposite sides of the electrolyte membrane in a region of the peripheral portions of the electrolyte membrane, and at least one elastic body is arranged between the first and second frames and between the frames and the respective separators and contacting the peripheral portions. The at least one elastic body may cover the entire surface of the first and second frames.

The configuration of the membrane for the fuel cell, the configuration of the membrane electrode assembly for the fuel cell, and the fuel cell having a membrane electrode assembly of the present invention can securely and easily seal the space between the separators and the spaces between each separator and the membrane for the fuel cell.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
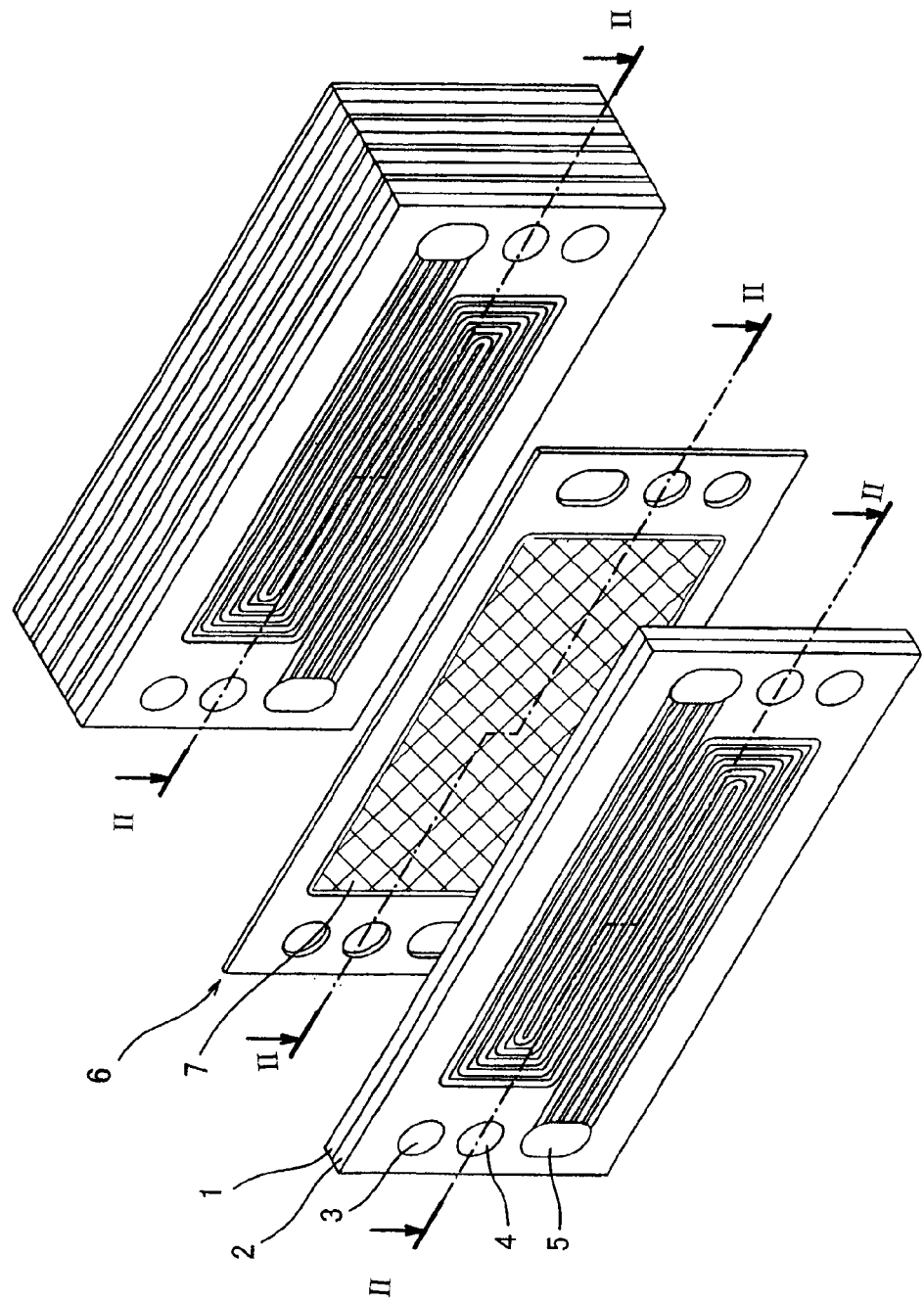
FIG. 1 is a perspective view, partially exploded, showing the configuration of a conventional fuel cell stack.
Figure 2:
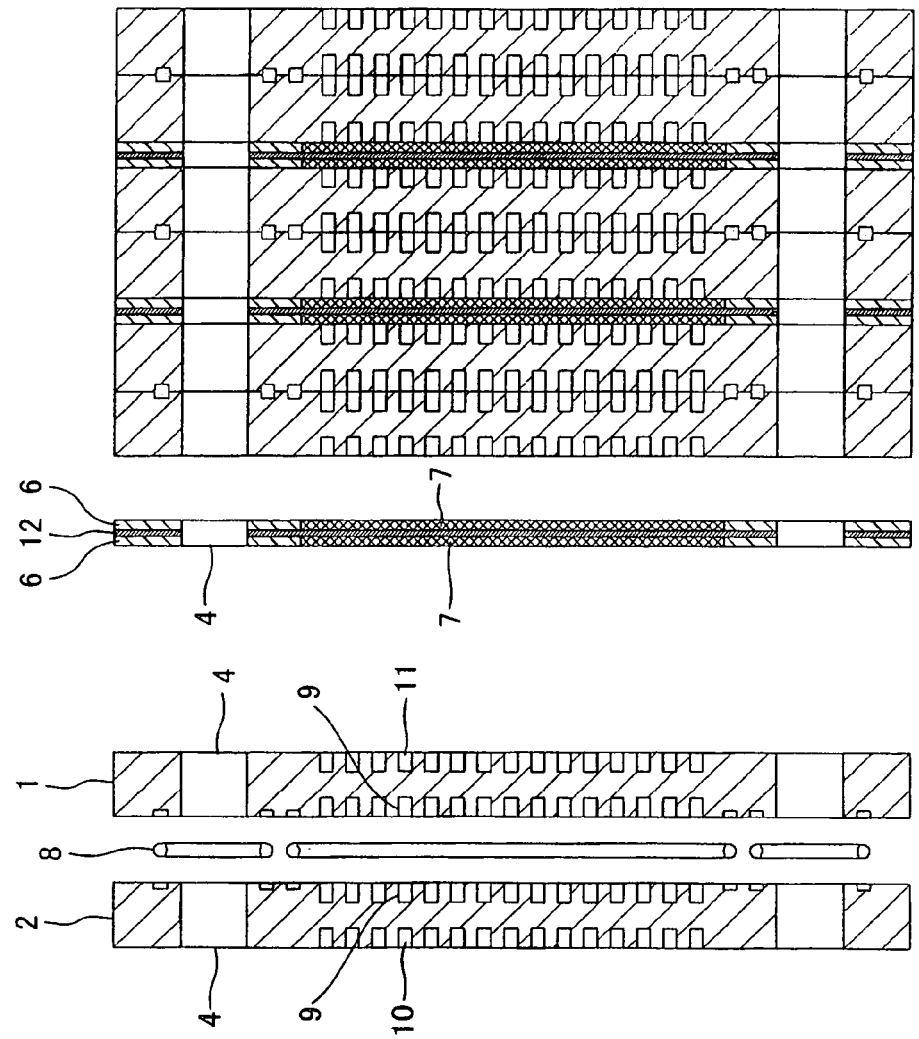
FIG. 2 is a cross sectional view along lines II-II of FIG. 1.
Figure 3:
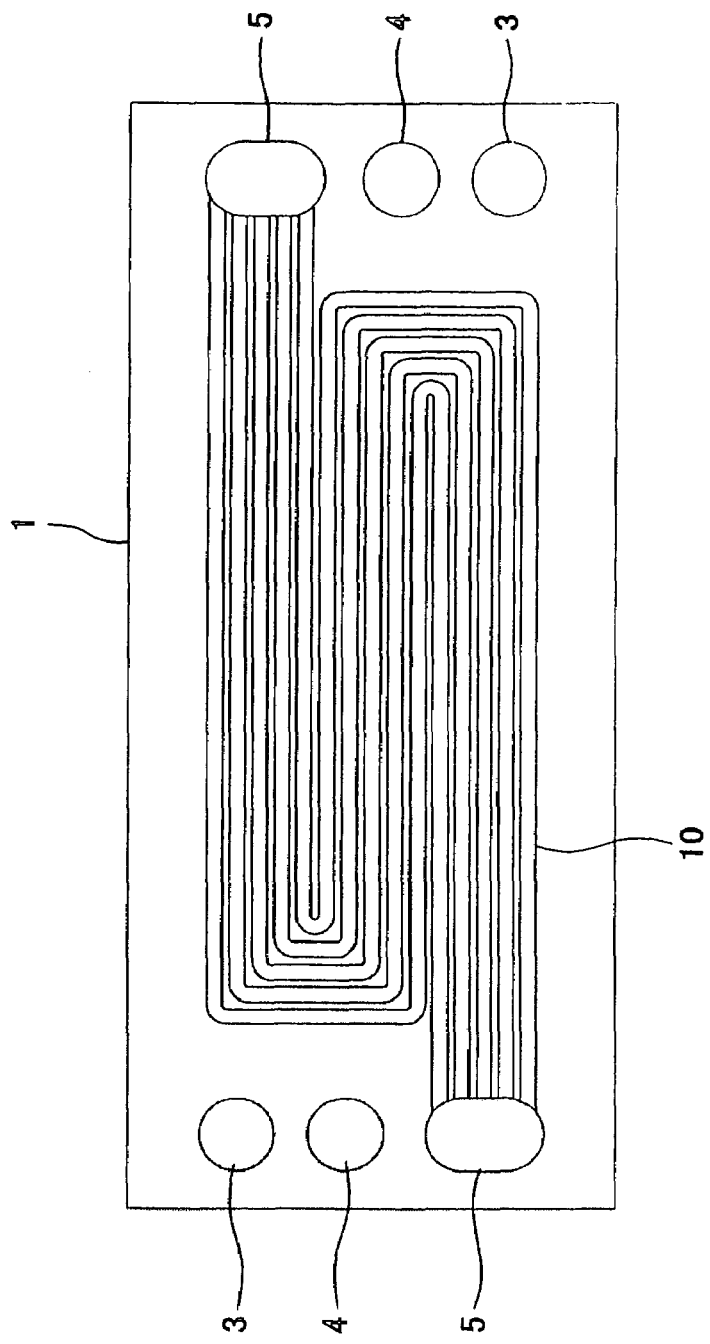
FIG. 3 is a plan view showing an example of the air flow channel pattern of a cathode separator in a conventional stack.
Figure 4:
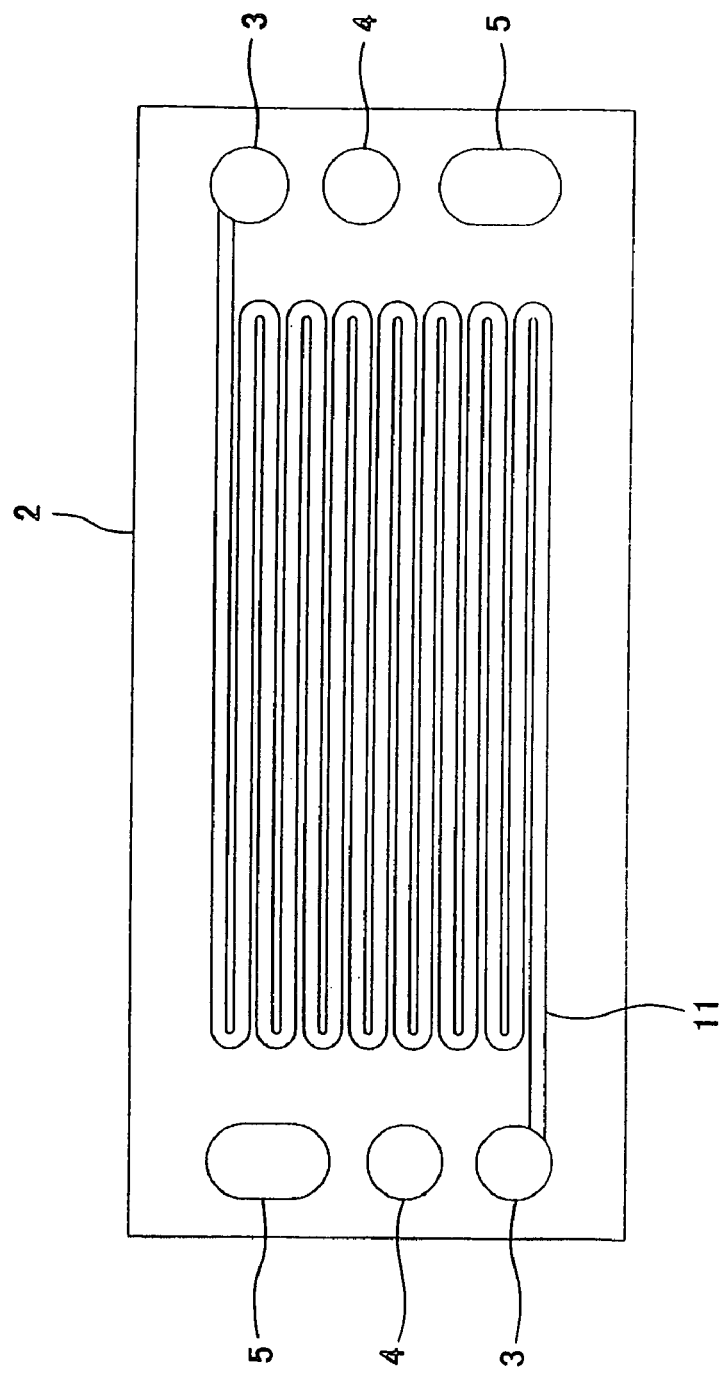
FIG. 4 is a plan view showing an example of the hydrogen flow channel pattern of an anode separator in a conventional stack.
Figure 5:
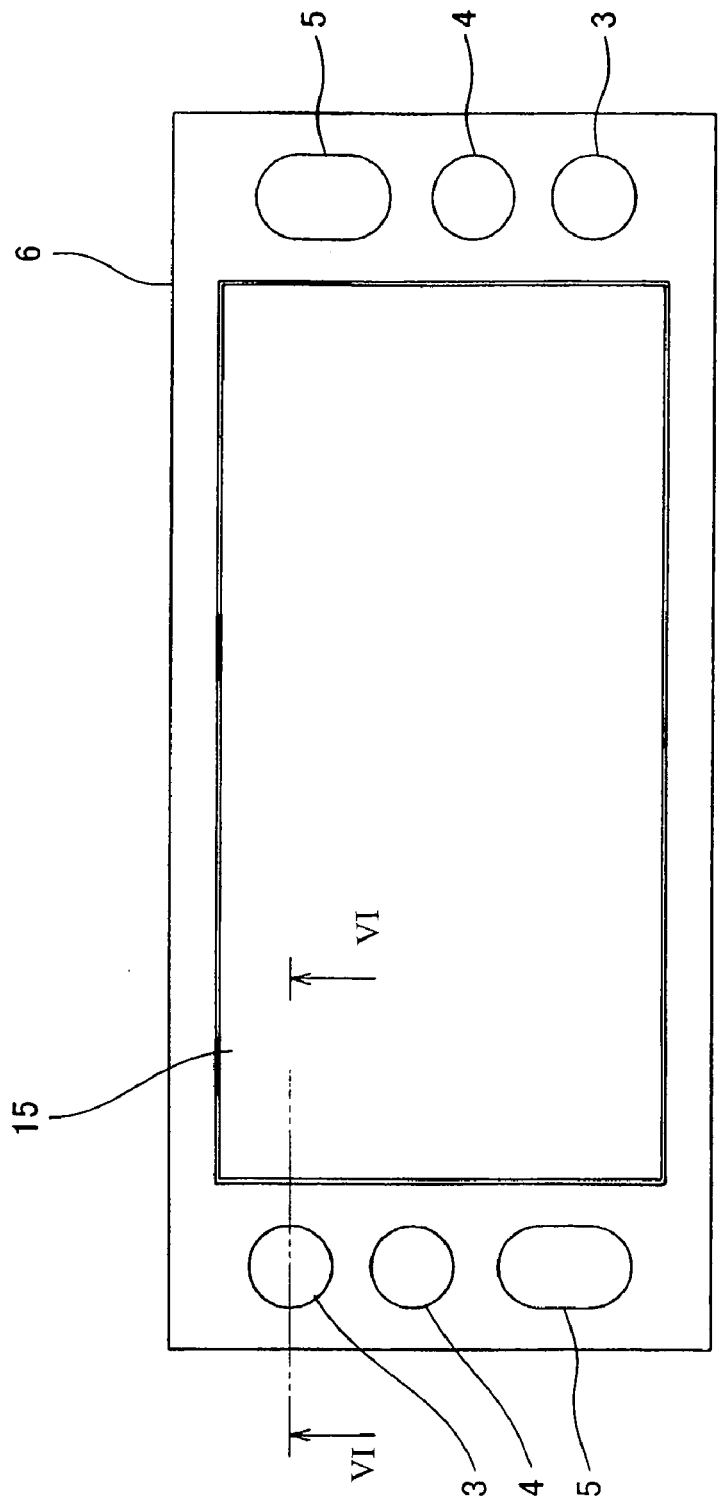
FIG. 5 is a plan view showing the configuration of an MEA and gasket that accommodate the cathode separator of FIG. 3 and the anode separator of FIG. 4.
Figure 6:
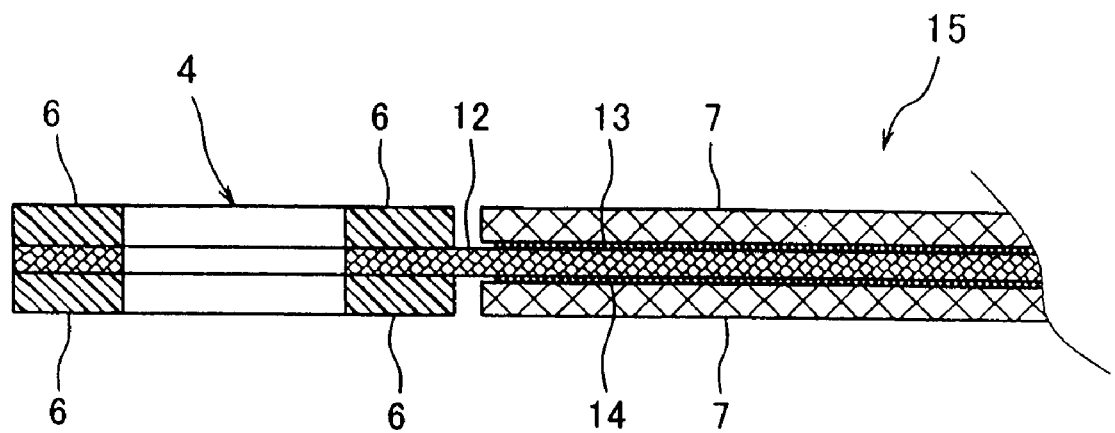
FIG. 6 is a cross sectional along line V-V of FIG. 5.
Figure 7:
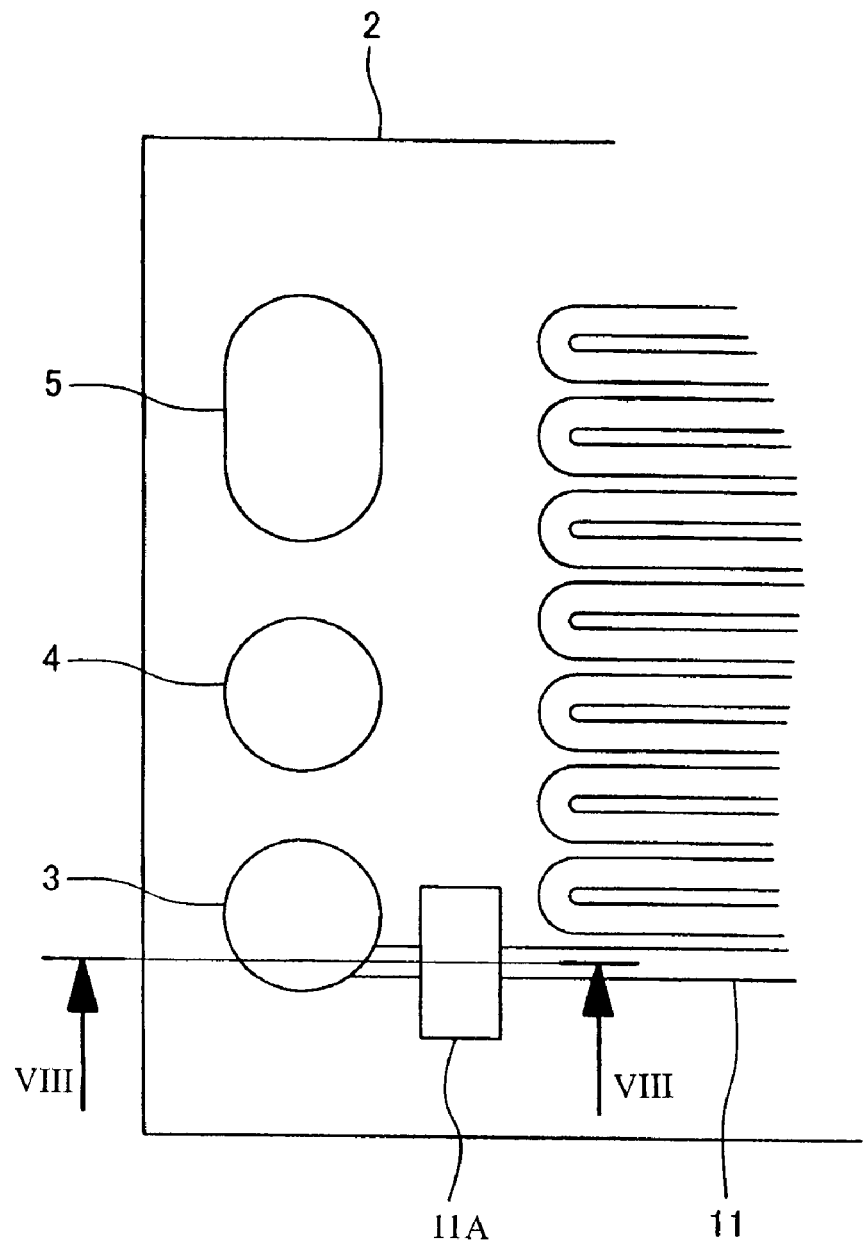
FIG. 7 is a plan view showing a portion of a conventional cathode separator.
Figure 8:
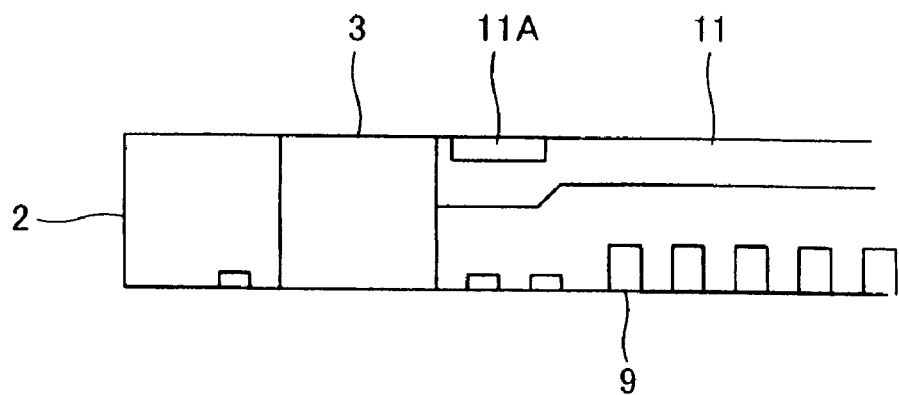
FIG. 8 is a cross sectional view along line VIII-VIII of FIG. 7.
Figure 9:
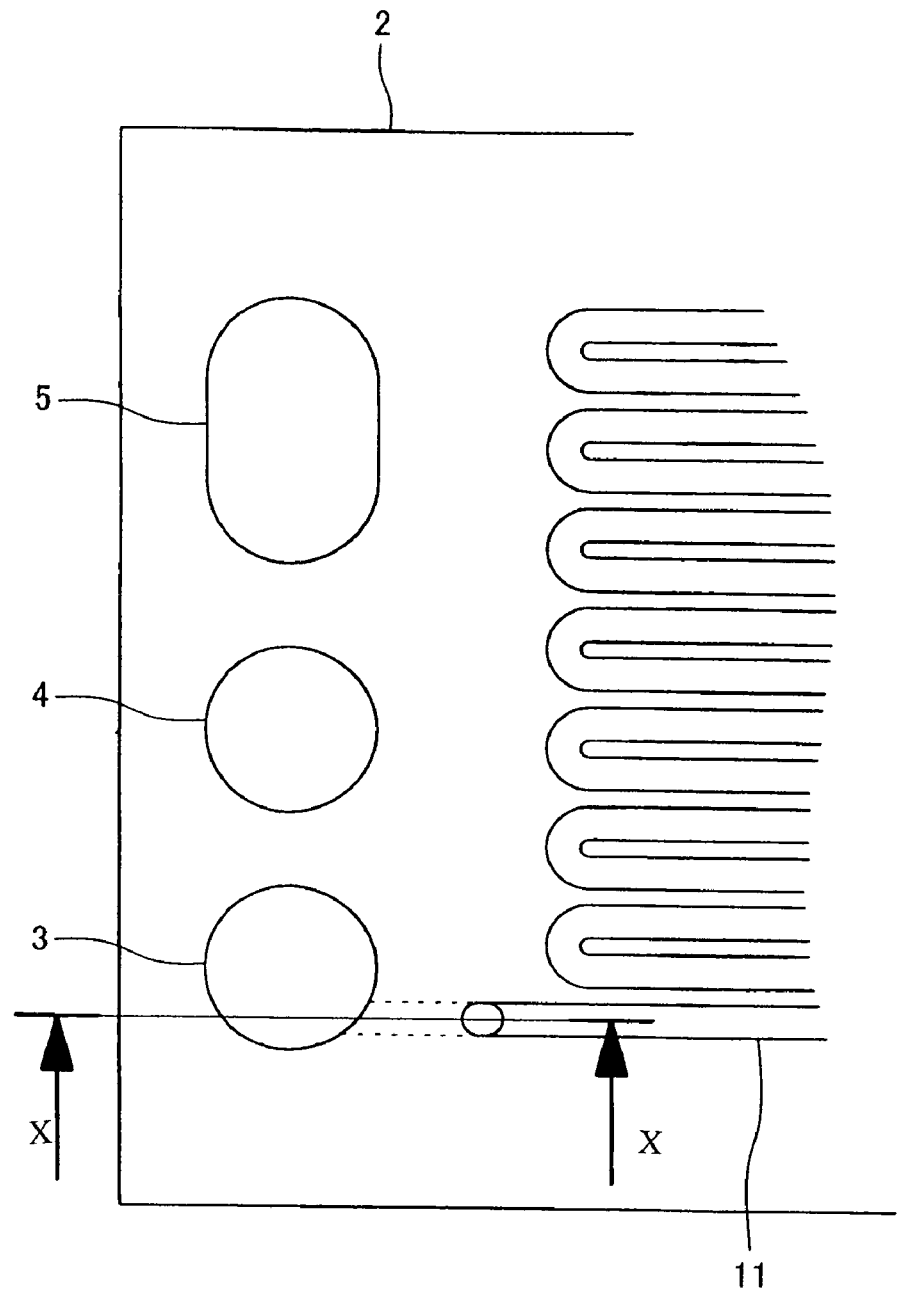
FIG. 9 is a plan view showing a portion of a conventional cathode separator.
Figure 10:
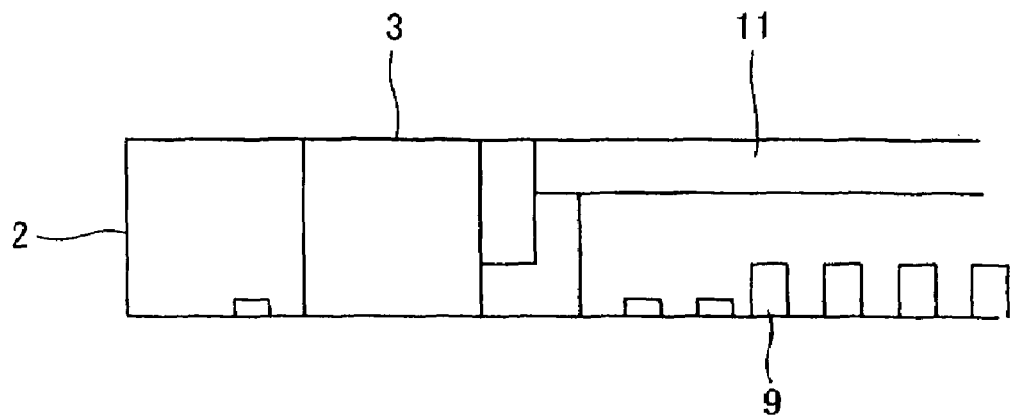
FIG. 10 is a cross sectional view along line X-X of FIG. 9.

The polymer membrane type fuel cell according to the present invention is able to prevent gas cross leakage by forming a seal for holding the membrane tightly with the separators via an elastic body, the seal being created by a highly rigid frame that covers and holds the peripheral part of the polymer membrane tightly without an intermediate or connecting part. The simplest method to create such a highly rigid frame body is to cover the peripheral part of the polymer with a highly rigid resin sealant. This means that this kind of frame can be easily produced by insert molding, which uses the polymer membrane for its insertion part.

It is preferred that the elastic modulus of the elastic body be less than about 200 MPa for making the assembly of the stack practical by the bonding without excessive weight. The reason is that the total sealing line, which seals each cell by a flat configuration, becomes longer in the polymer membrane fuel cell. For example, the total sealing line in the type of fuel cell stationed for household use (with an electrode area of approximately 200 cm$^2$) generally amounts to about 2 m, and the total sealing line for the type of fuel cell for automobile use (with an electrode area of approximately 1,000 cm$^2$) occasionally reaches more than 10 m, depending on the shape. When the total length of the sealing line is long, the line loading allowed on the sealing line must be less than 10 N/mm for assembling and bonding the stack with less than a few tons pressure including the loading on the electrode. When using an exposed thread (generally 0.2~0.3 mm in diameter) for absorbing the variation in thickness of the separator and the other components in the line loadings, it is impossible to assemble the stack if the elastic body has a elastic modulus in excess of about 200 MPa, even if the shape of the seal is modified. This is the reason why it is preferred that the elastic modulus of the elastic body used for this embodiment be in excess of 0 MPa and less than about 200 MPa. The elastic modulus of 200 MPa correlates approximately with a Durometer of 50 on the D hardness scale. Consequently, the commonly used materials, rubber or elastomer, which have a Durometer of about 50 on the D hardness scale, will of course fulfill the required conditions. However, PTFE, which is generally used as a sealing material, is not appropriate for use in this embodiment, because the elastic modulus is approximately 500 MPa.

The invention will be described in detail with respect to the following non-limiting Embodiments and specific Examples by way of illustration in connection with the accompanying drawings.

FIRST EMBODIMENT

In this embodiment, there is no restriction in the production process of the elastic body, because the elastic body, frame, and separator are all different material parts, and the elastic body can take on appropriate shapes, such as a rubber sheet, O-ring, etc. However, the higher the elastic modulus of the elastic body is, the more difficult the control of the shape becomes, because the width of the seal must be made narrower.

The preferred frame materials which come in contact with the above-mentioned elastic bodies should have the following properties. The frame should have chemical stability, such as the absence of dimensional change and the absence of chemical deterioration, because it comes into contact with the polymer membrane where the reaction occurs. Additionally, a high elastic modulus and high temperature flexibility are necessary to prevent the frame from drooping at the flow channel. Postulating that the flow channel width of the separator for the usual fuel cell is approximately 1~2 mm and the permitted thickness of the frame is generally less than 1 mm, the displacement caused by flexing when the above-mentioned line burden (10 N/mm) is loaded, is preferably kept within approximately 10% of the above-mentioned exposed thread. From this perspective, it is preferred for the elastic modulus of the elastic body material to be less than 200 MPa.

A frame bending load temperature of more than 120° C. is preferred, considering that the operating temperature is generally below 90° C. More specifically, crystalline resin is more preferred than non-crystalline resin from the viewpoint of chemical stability of resin materials, and preferably the so-called super engineering plastic grades, which have a high degree of mechanical strength and high heat resistance. Consequently, polyphenylene sulfide (PPS), polyether ether ketone (PEEK), liquid crystal polymer (LCP), and polyether nitrile (PEN) are preferred materials, because they show an elastic modulus of a few thousand to a few ten thousands MPa, and more than 150° C. of bending load temperature. Glass fiber filled polypropylene (GFPP), which is one of the multipurpose resins, is also considered a preferred material, because it has a few times higher elastic modulus compared to unfilled PP (elastic modulus 1,000~1,500 MPa) and a high bending load temperature, which is close to 150° C.

Furthermore, the most preferred method to produce frames is by inserting metals and other items which have a higher elastic modulus compared to resins, as later described, and among the metals especially steel shows the highest elastic modulus at about 2,000,000 MPa. As a result, the most preferred range for the elastic modulus of the frame material is about 2,000 MPa to less than about 2,000,000 MPa.

EXAMPLE 1

Figure 11:
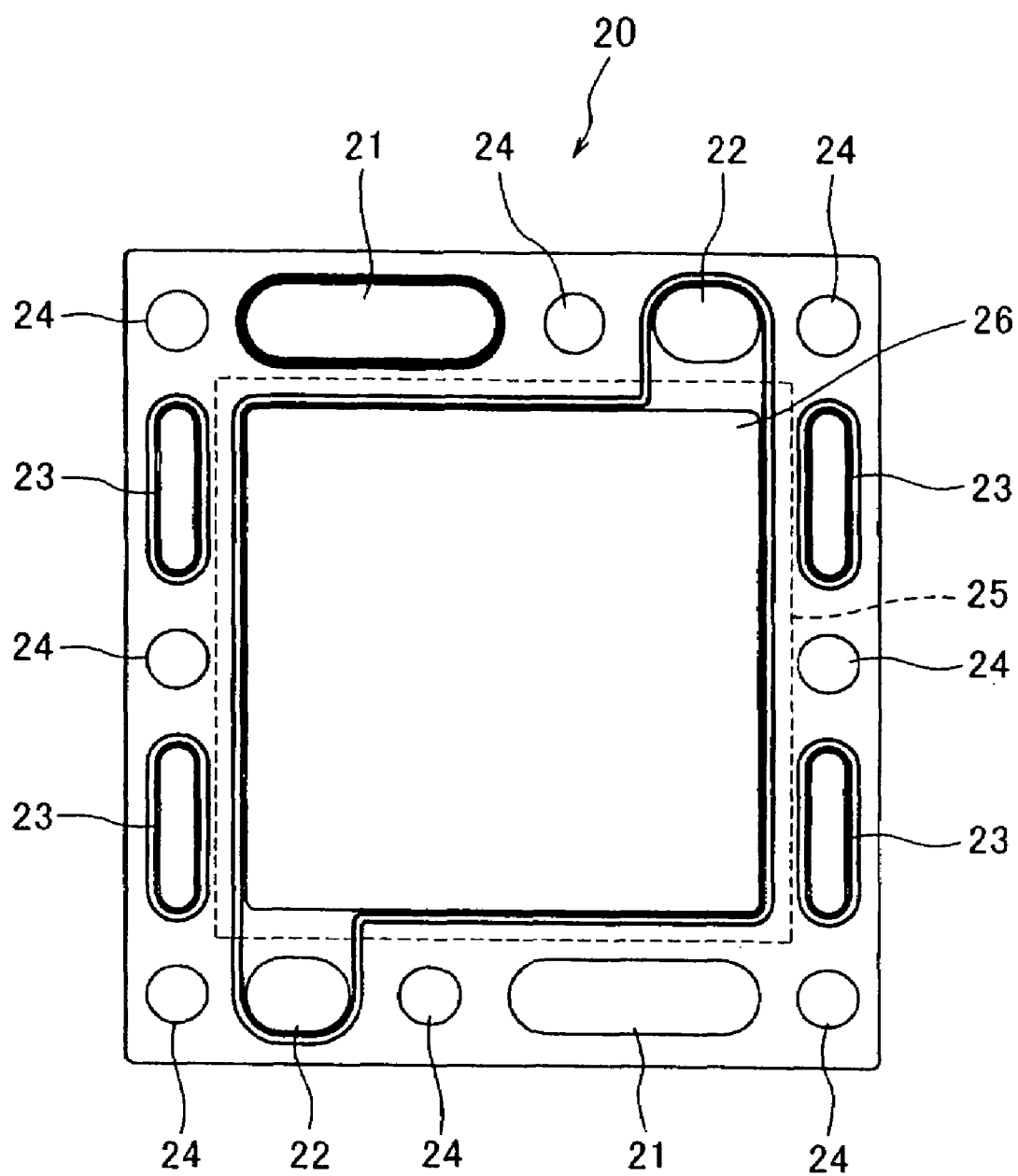
FIG. 11 is a plan view showing the anode side face configuration of the frame of the polymer membrane type fuel cell according to Example 1 of the present invention.
Figure 12:
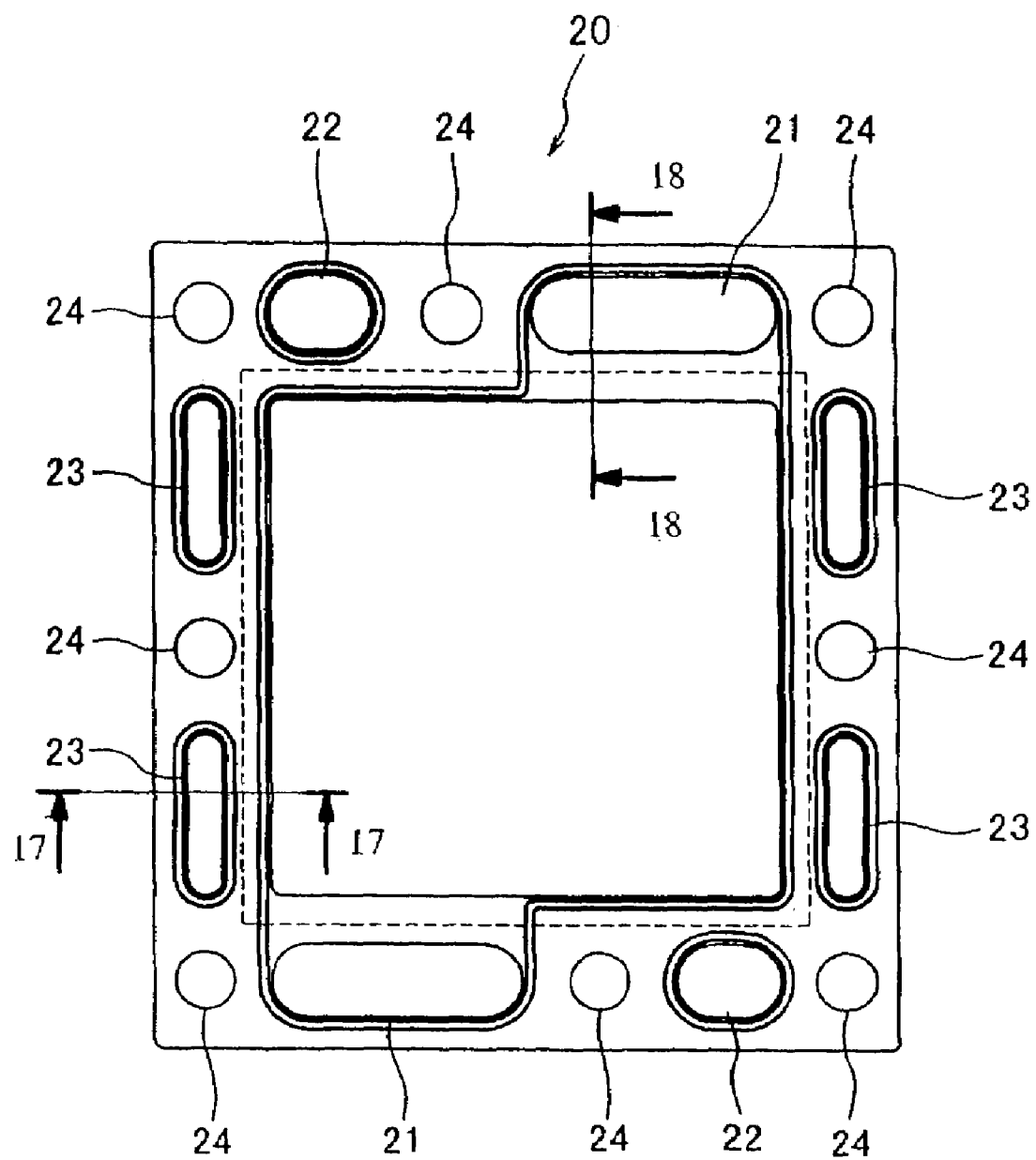
FIG. 12 is a plan view showing the cathode side face configuration of the frame of the polymer membrane type fuel cell according to Example 1.

FIG. 11 shows a plan view of the anode side of the frame of the polymer type fuel cell according to the first embodiment of the present invention. FIG. 12 shows a plan view of the cathode side.

A square shaped clear aperture 26 is provided in the center of frame 20 as shown in FIGS. 11 and 12. The square shaped MEA 25, which has a larger predetermined size than aperture 26 is held tightly by frame 20. Air manifold 21, hydrogen manifold 22, water manifold 23, and bolt holes 24 are formed appropriately.

This frame 20 having peripheral dimensions of 200 mm×180 mm, with opening 26 having a square side dimension of 124 mm, is molded by a 180 ton high speed injection molding machine of the Thomson type, using as an insert part a polymer membrane (NAFION® 114 perfluorinated sulfonic acid copolymer membrane, 50 µm thickness) punched out as a square shape of 140 mm on a side. This molded frame 20 is characterized by providing 2 lines of beads (seal lip), which are described below, with an apex angle of 60° C. on both sides and a base thickness of 0.8 mm.

Figure 19:
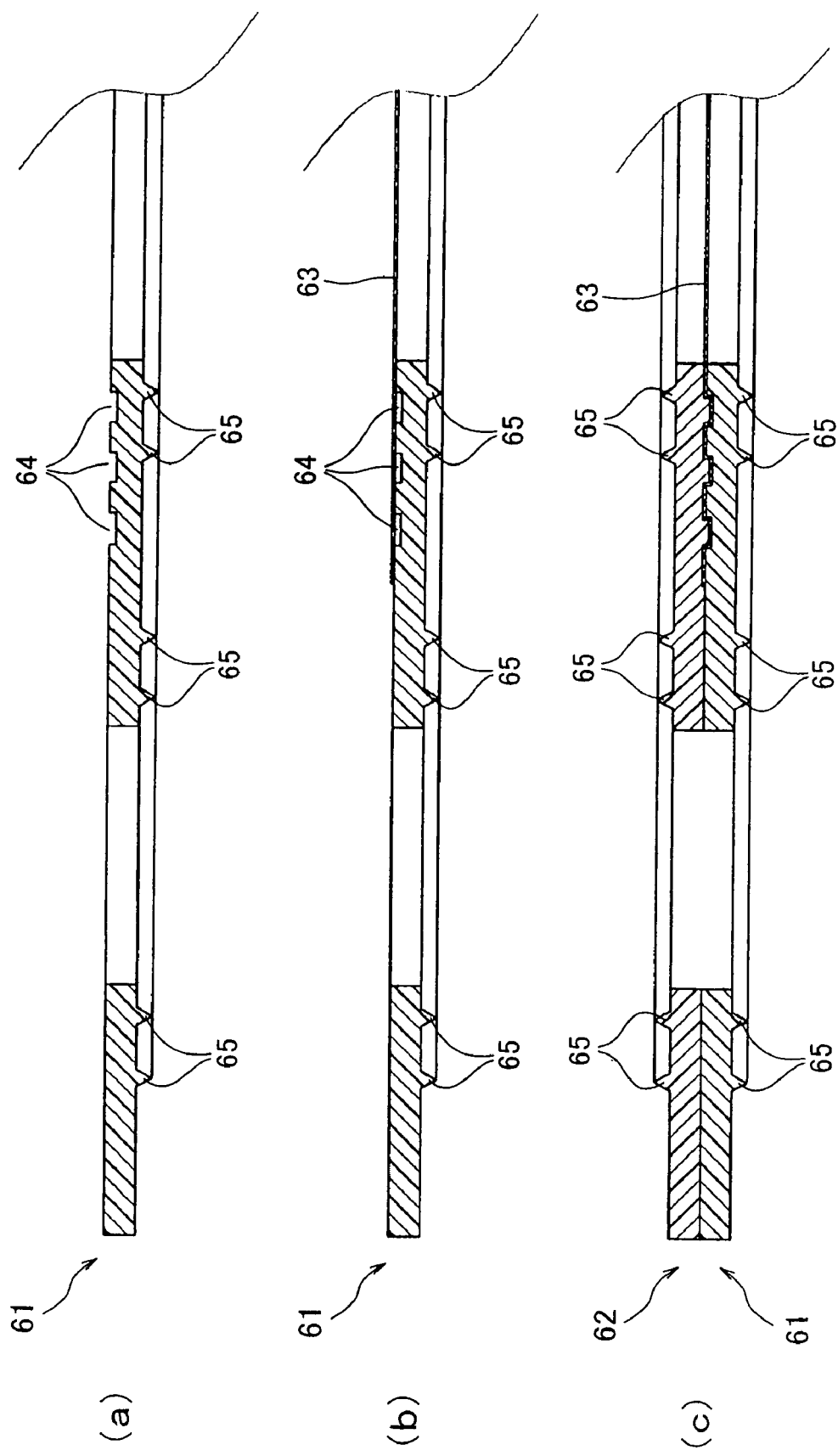
FIG. 19 is a cross sectional view showing the assembly process of the frame of the polymer membrane type fuel cell according to Example 1.

This Example uses the double molding method for the insert molding of frame 20. Half of the frame (the first molded part 61) shown in FIG. 19(*a*) is molded, and then the polymer membrane 63 is inserted as shown in FIG. 19(*b*). Next, the remaining half (the second molded part 62) as shown in FIG. 19(*c*) is molded using the same resin. The concave portions 64, having a height of 0.2 mm, a width of 0.5 mm, and a pitch of 1 mm, are prepared beforehand around the entire peripheral area of the first molded part 61 which contacts the insert part (polymer membrane 63), as shown in FIG. 19(*a*). In this case, when the second molded part 62 is applied, the peripheral part of polymer membrane 63 as the insert part is sealed by fusion bonding, and the polymer membrane 63 is deformed along the concave portions 64 of the first molded part 61 by the thickness of the injection. For this reason, polymer membrane 63 is supported firmly by the frame, so there is no slipping out through the inside part of the frame. In the Figures other than FIG. 19 the concavities and convexities provided on the peripheral part of the polymer membrane 63 are omitted as a matter of clarity, and simplified drawings have been drawn.

Although this Example of insert molding was performed using another die for the second molded part 62 after the first molded part 61 was made, as mentioned above, it is possible from the viewpoint of mass production to perform continuous molding using one die by utilizing a slide die or rotating die. Additionally, preferred molding was performed by using a glass filled PPS (Dainihon Ink Co., Ltd. DIC-PPS FZ 1140-B2). The conditions of molding were: an injection temperature of 310° C., a die temperature of 135° C., an injection pressure of 140 MPa, and an injection velocity of 560 mm/min.

In this specification and claims the configuration including the polymer membrane 63, as obtained through the above-mentioned method, and frame 20 is called the polymer membrane configuration. The electrode layers are formed on both sides of the polymer membrane 63, which forms the membrane electrode assembly (MEA), as described later.

Figure 13:
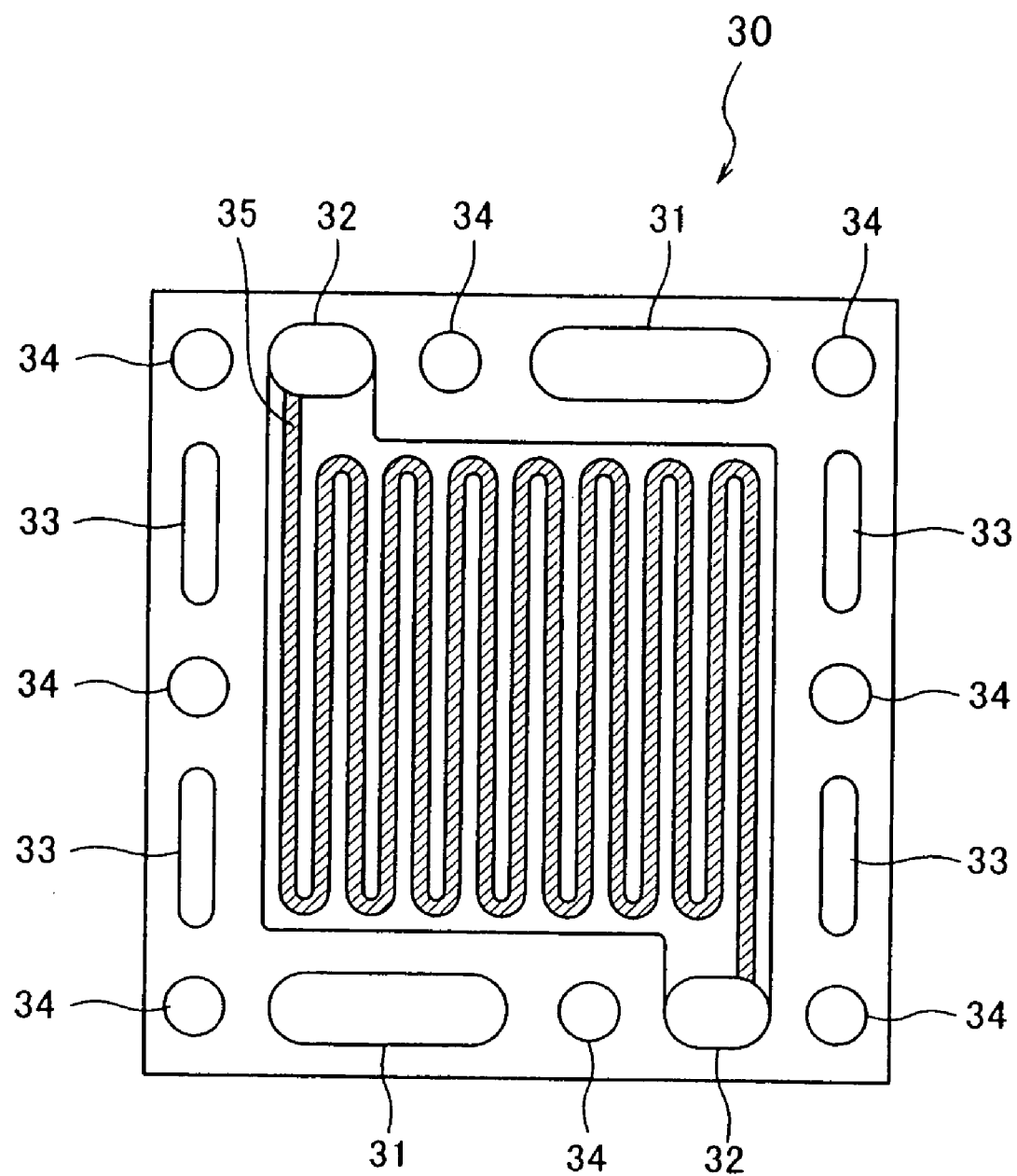
FIG. 13 is a plan view showing the configuration of the anode separator clamped on the surface of the anode side frame of the polymer membrane type fuel cell according to Example 1.
Figure 14:
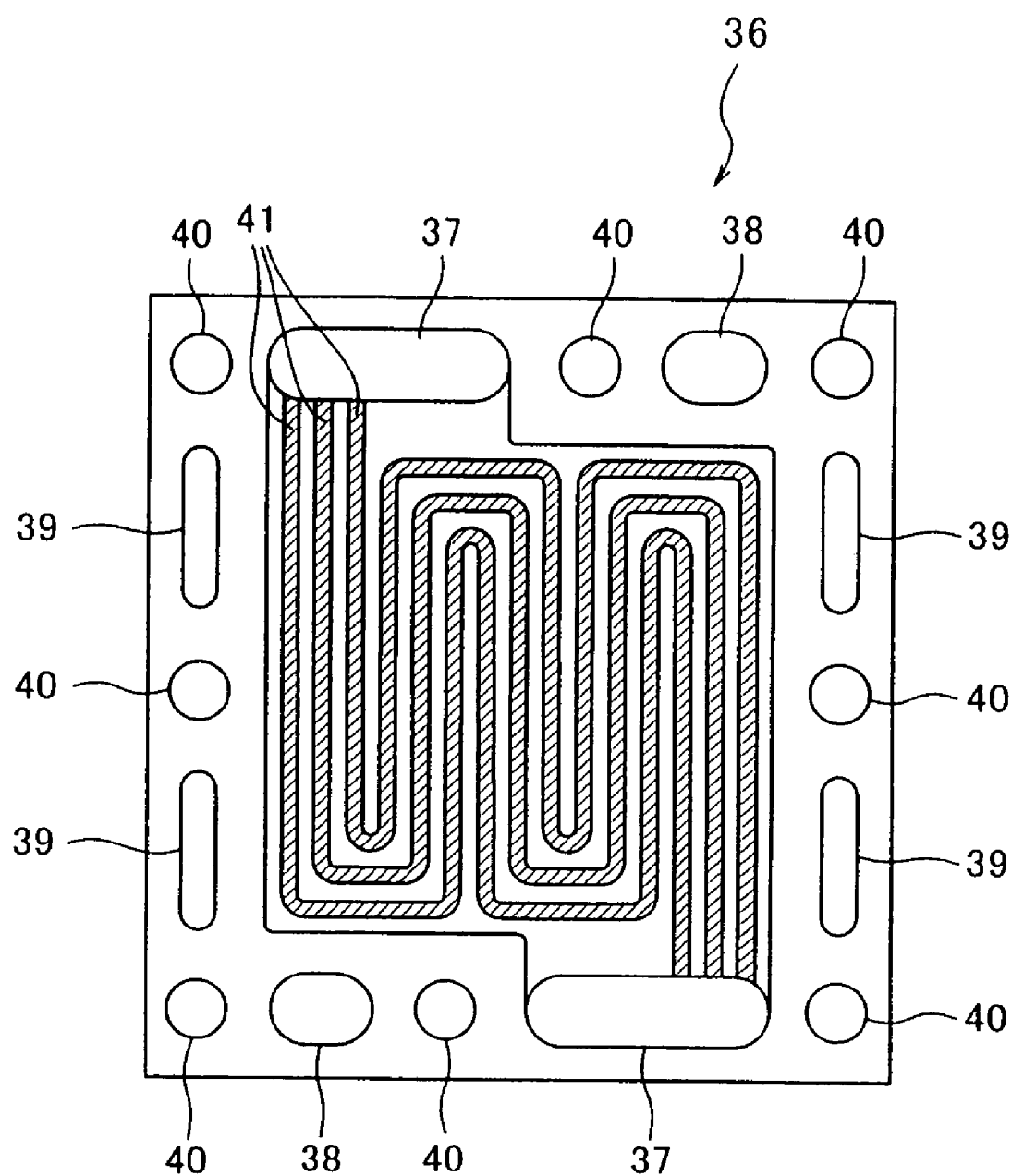
FIG. 14 is a plan view showing the configuration of the cathode separator clamped on the surface of the cathode side frame of the polymer membrane type fuel cell according to Example 1.

Separators are arranged on both sides of frame 20 shown in FIGS. 11 and 12. FIG. 13 is a plan view showing the anode separator which is to be clamped on the anode side of the frame of the polymer membrane type fuel cell according to this Example of the present invention. Additionally, FIG. 14 is a plan view showing the corresponding cathode separator which is to be clamped on the cathode side of the frame.

As shown in FIG. 13, hydrogen or other fuel gas flow channel 35 is formed by concave portions in a predetermined pattern in the center of the anode separator 30. Air manifold 21, hydrogen manifold 22, water manifold 23, and bolt holes 24, which are formed as apertures in frame 20, shown in FIG. 11, have corresponding apertures for air manifold 31, hydrogen manifold 32, water manifold 33, and bolt holes 34, respectively, in corresponding locations on the peripheral part of anode separator 30. Similarly, the airflow channels 41 are formed as a predetermined pattern in the center of the cathode separator 36 shown in FIG. 14. The air manifold 21, hydrogen manifold 22, water manifold 23, and bolt holes 24 formed as apertures in frame 20 shown in FIG. 12, have corresponding apertures for air manifold 37, hydrogen manifold 38, the water manifold 39, and bolt holes 40, respectively, in corresponding locations on the peripheral part of the cathode separator 36, as indicated in FIG. 14.

Figure 15:
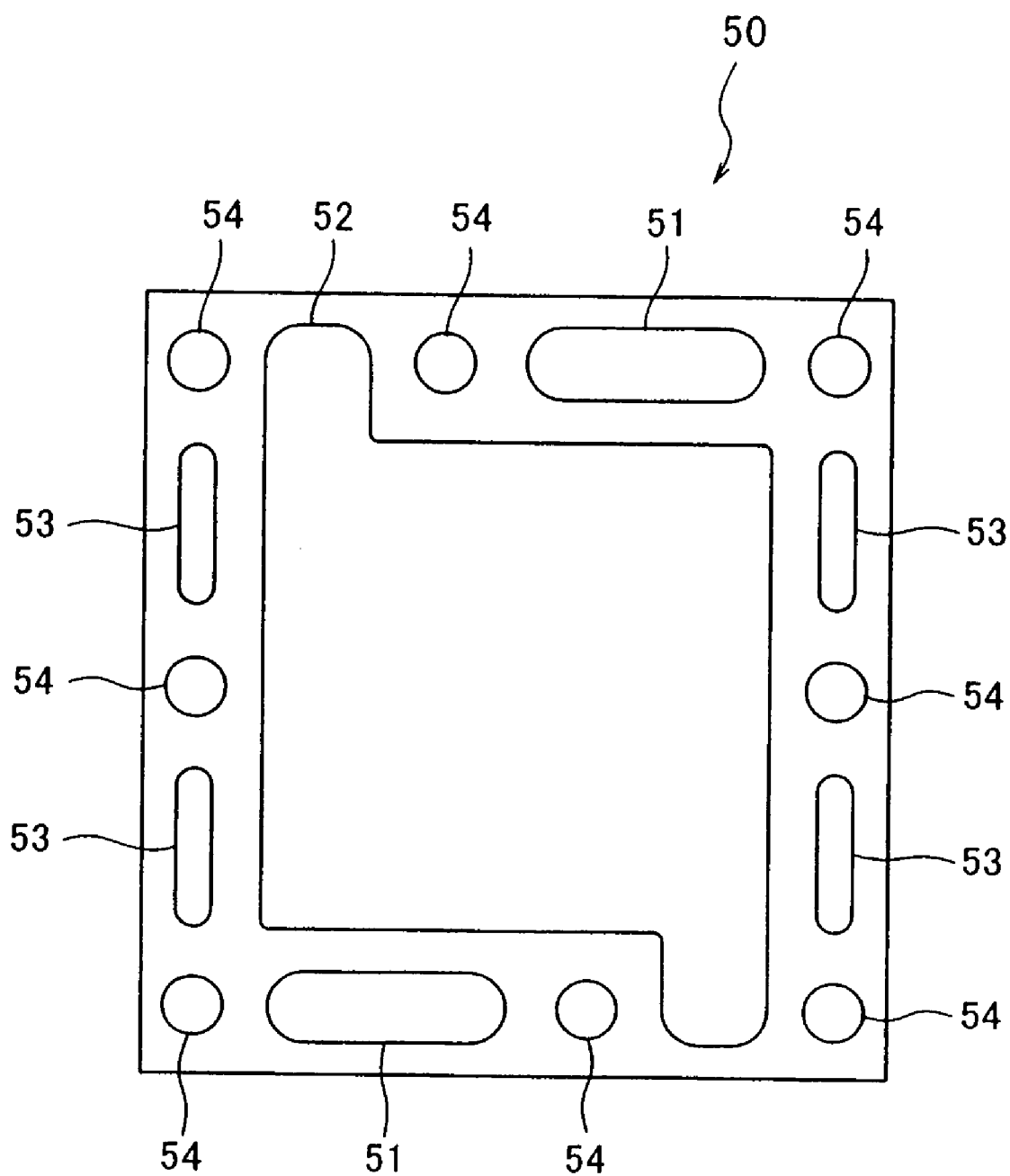
FIG. 15 is a plan view showing the configuration of the rubber sheet arranged between the anode separator and the frame of the polymer membrane type fuel cell according to Example 1.
Figure 16:
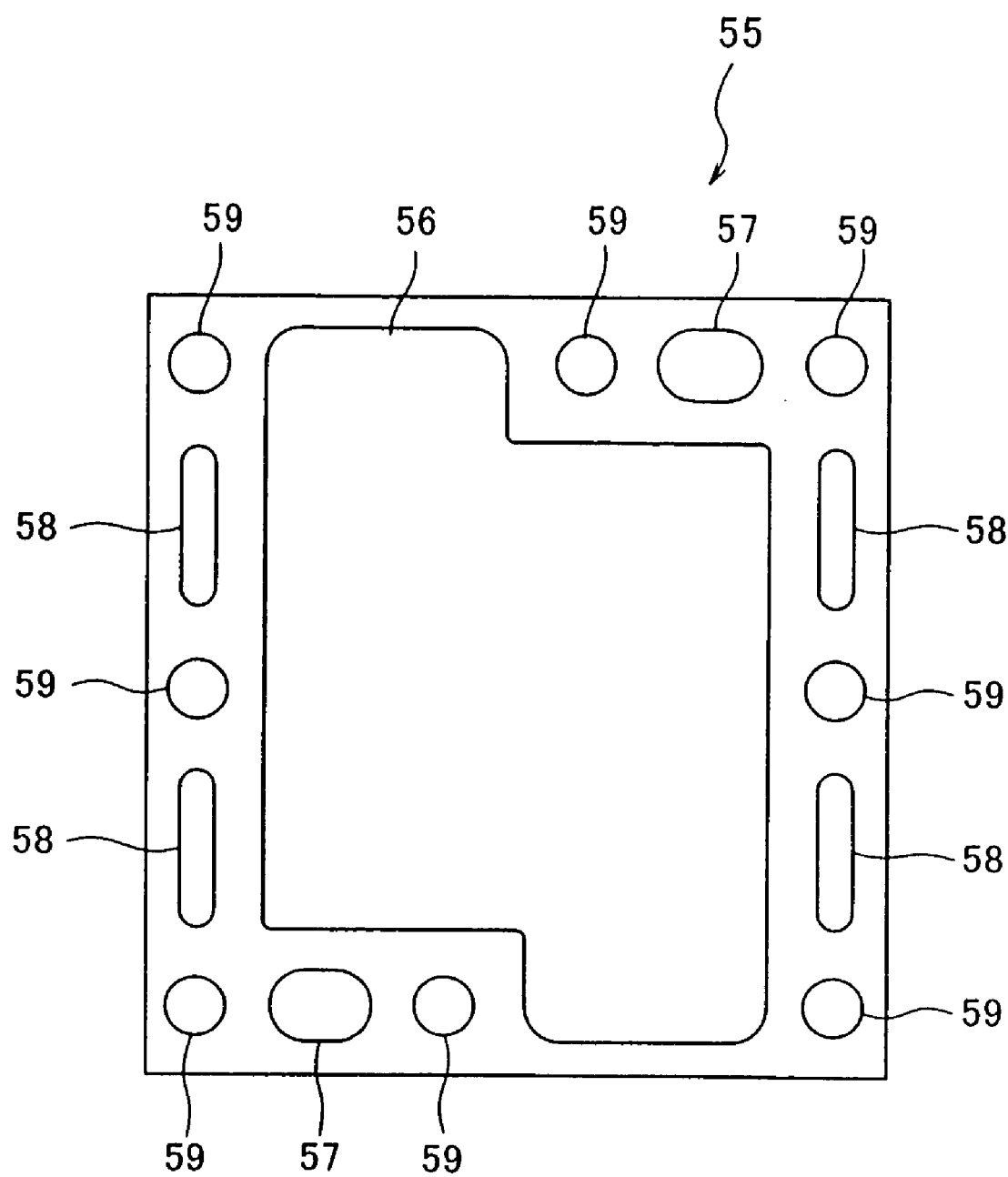
FIG. 16 is a plan view showing the configuration of the rubber sheet arranged between the cathode separator and the frame of the polymer membrane type fuel cell according to Example 1.

The anode separator 30 and the cathode separator 36 are made by machine cutting using Grassi carbon (t=3 mm) made by Tokai Carbon Co., Ltd. as the material. A 0.7 mm counter O-ring recess was formed in the contact area of each of the anode separator 30 and cathode separator 36 to accept the rubber sheets described later. The above-mentioned frame 20, anode separator 30 and cathode separator 36 are clamped via respective rubber sheets. FIG. 15 is a plan view of a rubber sheet configuration, which is arranged between the frame and an anode separator of the polymer membrane type fuel cell according to the first embodiment of the present invention. FIG. 16 is a plan view of a rubber sheet configuration arranged between the frame and the cathode separator.

Aperture 52 is formed in the center of the rubber sheet 50 for the anode side, as shown in FIG. 15, in the area corresponding with the hydrogen manifold and the rectangular aperture 26 formed in frame 20 shown in FIG. 11. Air manifold 51, water manifold 53, and bolt holes 54 are formed on the peripheral part of rubber sheet 50 in the corresponding locations to air manifold 21, water manifold 23 and bolt holes 24, respectively, formed in frame 20 shown in FIG. 11.

Similarly, aperture 56 is formed in the center of the rubber sheet 55 on the cathode side, as shown in FIG. 16 in the corresponding area as rectangular aperture 26 formed on frame 20, as indicated in FIG. 12. Hydrogen manifold 57, water manifold 58, and bolt holes 59 are formed in the peripheral part of rubber sheet 55 in the corresponding locations to hydrogen manifold 22, water manifold 23, and bolt holes 24, respectively, formed in frame 20 shown in FIG. 12.

A 0.6 mm thickness Paiton rubber sheet (55 Durometer hardness, made by Fujikura Rubber Co., Ltd.) was used for rubber sheets 50 and 55 for crimping to the bead part of the cathode side and the anode side of frame 20, respectively, referring to FIGS. 15 and 16.

Although this Example fixes the frame and the separator via the rubber sheet, other elastic bodies besides rubber can be used. This elastic body is required for bending ability, which is more than approximately 0.2 mm in the above-mentioned line loading (10 N/mm), especially from the viewpoint of compensation for low surface accuracy of the molded separator, and for elasticity, which is more than 0 MPa and less than about 200 MPa.

This elastic body does not make contact with the polymer membrane, but heat and water resistance properties are necessary because it is always exposed to humidified gas, which generally has a temperature of more than 70° C. and less than 90° C. If using a vulcanized gum, one should pay attention to the vulcanizing method because of adverse effects of eluting materials, such as sulfur, halogen, etc. on the catalysts of the fuel cell. Consequently, the preferred materials are EPDM, fluorine rubber, etc, which are rubber materials with high thermostablility and high water-resistant properties, and the above-mentioned peroxide bridge formation type or electron beam bridge formation type, not the sulfur bridge formation type. Additionally, TPEs (thermoplastic elastomers), such as the polyolefin group elastomer (TPO) and the fluorine group elastomer, etc., which are used in the above-mentioned material for a soft segment and a thermoplastic resin material for a hard segment, are applicable for usage.

Figure 17:
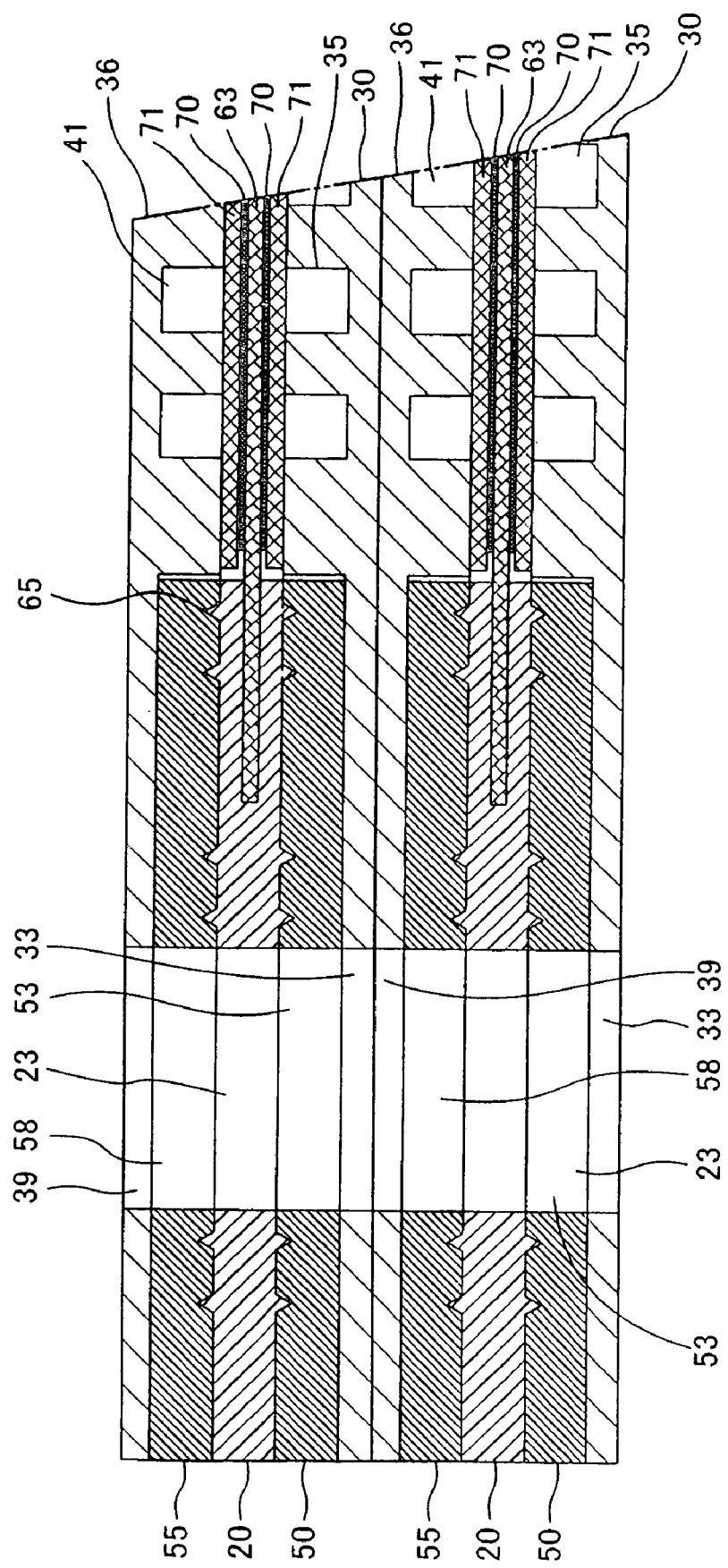
FIG. 17 is a partial cross sectional view of the proximity of the water manifold in the polymer membrane type fuel cell according to Example 1.
Figure 18:
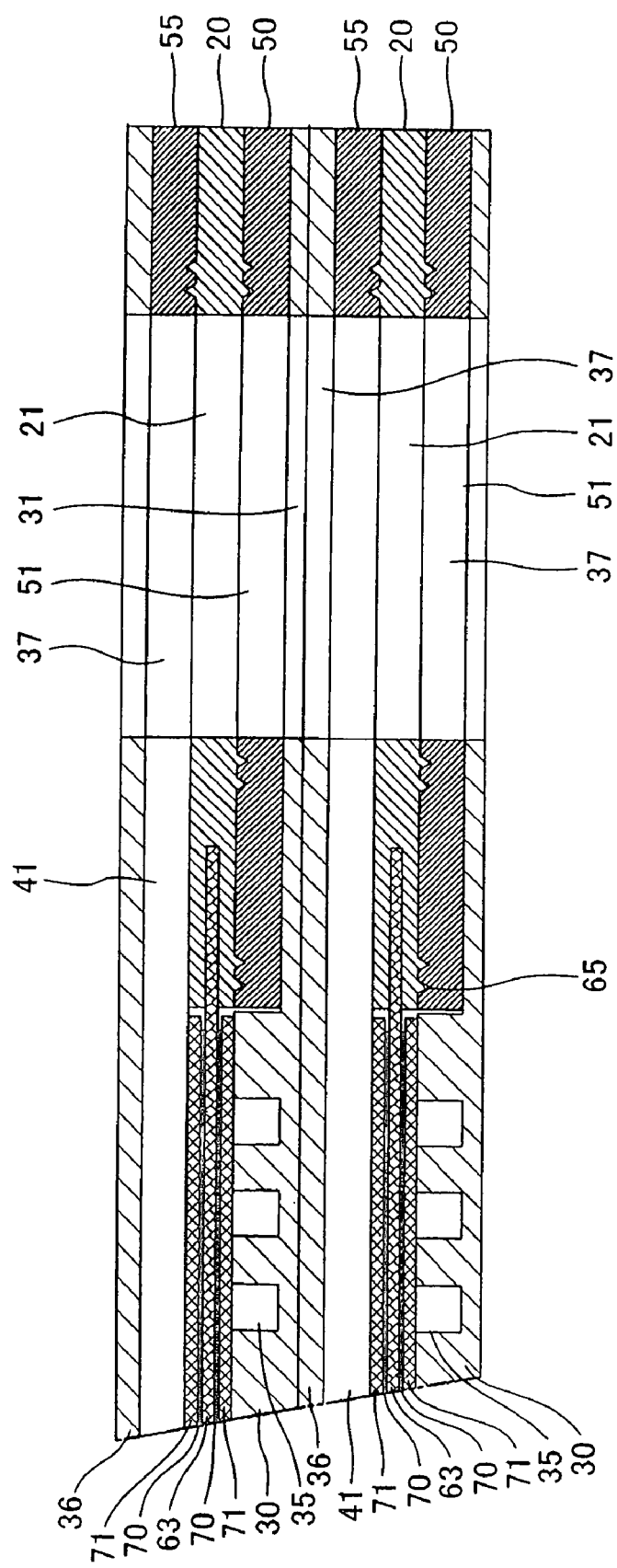
FIG. 18 is a partial cross sectional view of the proximity of the air manifold in the polymer membrane type fuel cell according to Example 1.

FIG. 17 is a partial cross sectional view showing the proximity of the water manifold in the polymer membrane type fuel cell suggested in first embodiment of the present invention. FIG. 18 is a partial cross sectional view showing the proximity of the air manifold. FIGS. 17 and 18 are the stacked cross sectional views corresponding to lines 17-17 and 18-18 in FIG. 12.

The cooling water flow channel and the sealing configuration of the cooling water surfaces, which are provided in the anode separator 30 and the cathode separator 36, are not shown in FIGS. 17 and 18, for ease of illustration. However, the cooling water flow channel and the sealing configuration of the cooling water surfaces are concave portions in the same manner as is conventional in the art.

Next, the MEA configuration will be explained. The catalyst layers 70 are formed on both sides of the polymer membrane as indicated in FIG. 17 and FIG. 18. Each catalyst layer is formed as follows. Platinum particles are carried in a weight proportion of 1:1 with Ketchenblack EC (carbon black made by Ketchenblack International Co., Ltd.), which has specific surface area of 800 $m^2/g$ and a DBP oil absorption of 360 ml/100 g. A liquid dispersion (made by Asahi Glass Co., Ltd. 9% FSS) of hydrogen ion conductive polymer electrolyte in 35 g of water and 59 g of alcohol were continuously mixed with 10 g of this catalyst powder. Catalyst layer ink was made from this mixture by dispersing with an ultrasonic agitator. Polypropylene film (Torefan 50-2500 made by Tore Co., Ltd.) was coated with this catalyst ink, and catalyst layers 70 were made by drying the coated film. The catalyst layers 70 obtained were cut to a size of 120 mm×120 mm, and then laminated under conditions of 135° C. and 32 kg·f/$cm^2$ of pressure to the above-mentioned exposed part of polymer membrane 63 in the molded frame, in other words, on both sides where it will not contact frame 20.

After the formation of catalyst layers 70 on both sides of polymer membrane 63, a gas diffusion layer 71 (Carpel CF 400 made by Japan Goatex), 400 micron thick and 123 mm on a side, was arranged on catalyst layer 70. Frame 20, which holds the peripheral areas of the polymer membrane 63, as shown in FIG. 17 and FIG. 18, is held tightly by an anode separator 30 and cathode separator 36 via rubber sheets 50 and 55. Twelve cells, made as described above, were assembled by bonding jig with a bonding force of 850 kg·f to make a 12-cell stack.

The 12-cell stack, assembled according to the above-described method, was subjected to the following characteristic evaluation tests.

(1) Conventional Cross Leakage Test

The cross leakage test is conducted by measuring the amount of gas leaking from the cathode side by connecting a nitrogen gas supply, which can produce three times the usual pressure of the cogeneration fuel cell, i.e., 30 kPa, to the hydrogen manifold of the 12-cell stack.

(2) Limiting Cross Leakage Test

The limiting cross leakage test measures the gas pressure supplied when the gas starts leaking from the cathode side by gradually increasing the supplied gas pressure to the hydrogen manifold of the above-described stack.

The common cross leak test demonstrated that gas leaking from the cathode side was 0 cc. The result of the limiting cross leakage test was 610 kPa of pressure supplied when the gas started to leak from the cathode side.

As mentioned above, the conventional cross leakage test demonstrated preferred characteristics, i.e., that gas leakage was not observable and that the open circuit voltage of the cell was approximately 0.99V. The purpose of the limiting cross leakage test was to find out the reaction of the cells when a sudden change in the gas supply system occurred, such as the motion which results from opening and closing a valve. The above-mentioned test result shows that a relevant cell stack can accommodate to a high-pressure gas supply use (e.g., the supply source pressure for in-vehicle use is approximately 180 kPa.) In this regard, however, the pressure difference between electrodes is a small fraction of this pressure).

Figure 35:
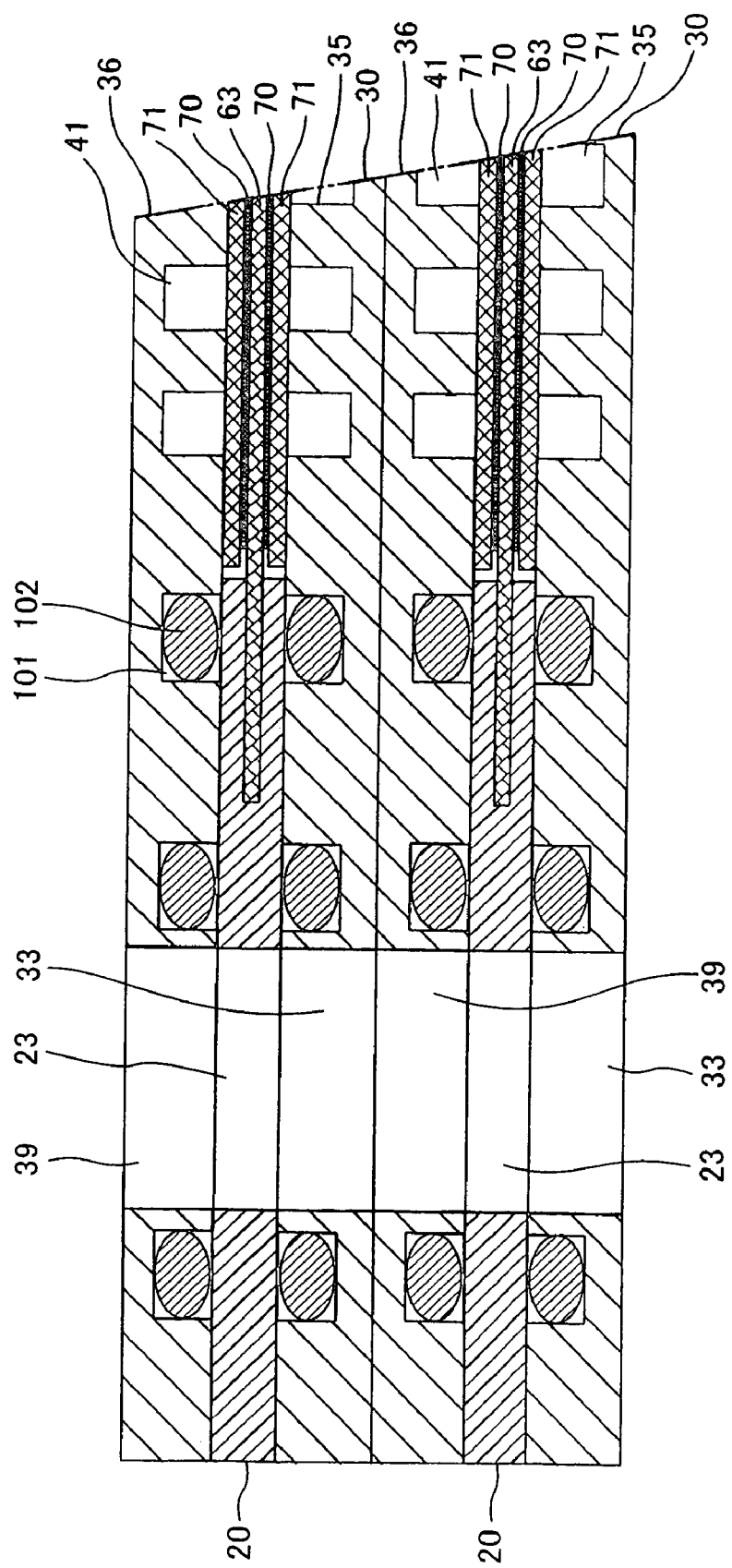
FIG. 35 is a partial cross sectional view showing a deformation in the proximity of the water manifold in the polymer membrane type fuel cell according to Example 1.

This Example suggests that the elastic body provided between the separator and the frame be in a sheet form. Yet it is not limited to a sheet form, and it may also be a linear shape, such as in a plurality of O-rings or square rings. The area of the separator where the elastic body is received may be designed to accept the appropriate shape, such as having an accommodating groove for the O-ring. FIG. 35 shows a cross sectional view of the relevant part using an O-ring. The example shown in FIG. 35 provides groove 101 where O-ring 102 is set into the anode separator 30 and cathode separator 36.

Depending on the nature of the material, an appropriate configuration for ensuring sealing or for reducing the bonding force is preferred, such as the provision of a bead (sealing lip) using a rubber sheet for the elastic body (this Example provides it on the frame).

SECOND EMBODIMENT

The elastic body was arranged between the frame and the separator in Example 1. The polymer membrane type fuel cell of Example 2 uses an elastic separator and does not need a separate elastic body, which was necessary in Example 1. To be more precise, the elasticity is provided to the separator itself by using a molded separator (elastic modulus of approximately 150 MPa), which is produced by press molding an expanded (foamed) graphite blended with resin.

In this case, materials and configurations are preferred which can obtain the necessary displacement for reducing the bonding force required to assemble the stack, such as using a high strength material (preferably the elastic modulus is more than 10,000 KPa) and providing a bead (triangular lip) on the frame, which allows it to snap into the separator.

EXAMPLE 2

Figure 20:
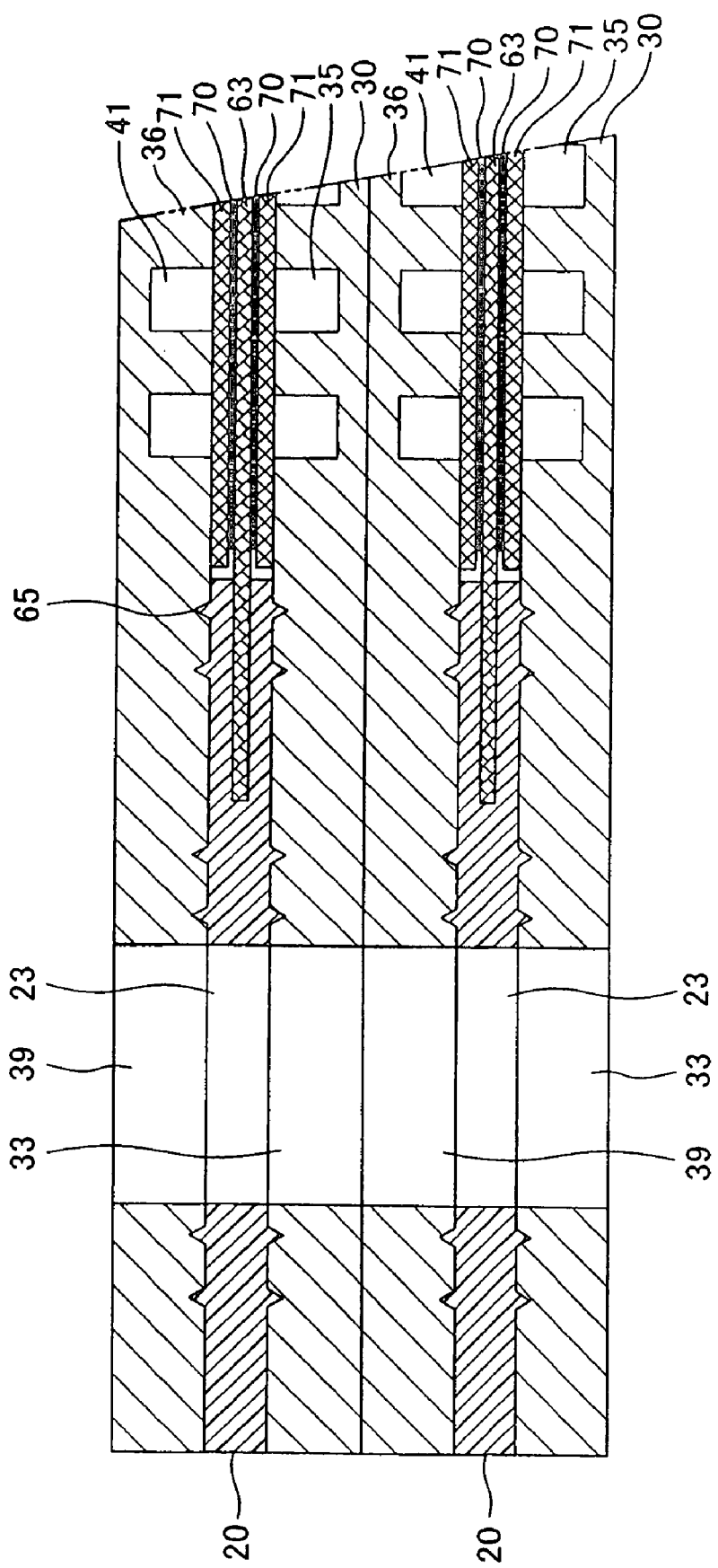
FIG. 20 is a partial cross sectional view of the proximity of the water manifold in the polymer membrane type fuel cell according to Example 2 of the present invention.
Figure 21:
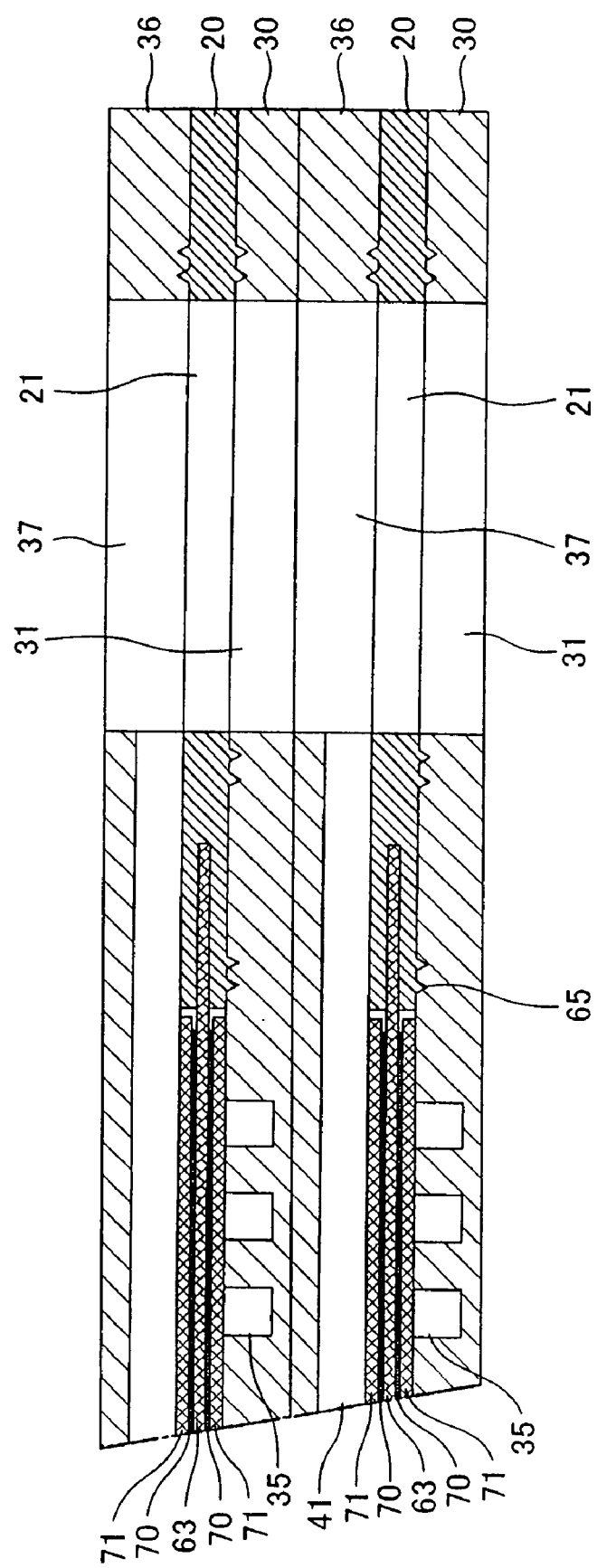
FIG. 21 is a partial cross sectional view of the proximity of the air manifold in the polymer membrane type fuel cell according to Example 2.

FIG. 20 is a partial cross sectional view showing the water manifold 23, 33, 39, and its proximity in the polymer membrane fuel type cell according to the second embodiment, and FIG. 21 is a partial cross sectional view showing the configuration of the air manifold 21, 31, 37 proximal to it. FIGS. 20 and 21 are cross sectional views of the stack, which correspond with parts in FIGS. 17 and 18, respectively, in Example 1. The cooling water flow channels and sealing configuration of the cooling water surface, which are provided in the anode separator 30 and the cathode separator 36 shown in FIG. 20, are the same as in FIG. 17, so explanation has been omitted as a matter of clarity. FIGS. 20 and 21 depict frame 20 holding the peripheral area of polymer membrane 63, which is held tightly by anode separator 30 and cathode separator 36, which are made with expanded graphite. An expanded graphite molded separator (made by Hitachi Kasei Co., Ltd.), in which the expanded graphite blended with resin is press molded, can be used for anode separator 30 and cathode separator 36.

FIGS. 20 and 21 show that beads (triangular lips) 65 are provided on both sides of frame 20, and in the same way as the sheets of Example 1, these beads can cut into elastic anode separator 30 and cathode separator 35. This configuration achieves sufficient sealing effect even if it is bonded with a comparatively small force. Additionally, frame 20 is preferably made with a comparatively high strength material (preferred elastic modulus is more than 10,000 MPa) in this case.

Twelve cells made by the above-described method were bonded with 1400 kg·f of bonding force via a bonding jig to assemble a 12-cell stack.

The present inventors conducted a conventional cross leakage test and a limiting cross leakage test, in the same manner as conducted in Example 1, for the of the insertion molded assembly.

The conventional leakage test resulted in 0 cc gas leakage from the cathode side, and the result of the limiting cross leakage test required a 465 kPa supply of source pressure to produce gas leakage from the cathode side.

The above results demonstrate that when the separator itself is the elastic body, simplification of the configuration and assembly were obtained, because they can practically establish a sufficient sealing effect without the elastic body between the frame and the separator.

THIRD EMBODIMENT

The polymer membrane type fuel cell according to the third embodiment is formed by insertion molding of the separator for unification with an elastic body, as described for the frame in Example 1.

The separator, having carbon as its main ingredient, does not substantially adhere to elastomers, such as fluorine resin and EPDM. For this reason, the assembly is devised with latched grooves, as explained below, for preventing separation of the separator and the elastic body due to constriction after molding.

EXAMPLE 3

Figure 36:
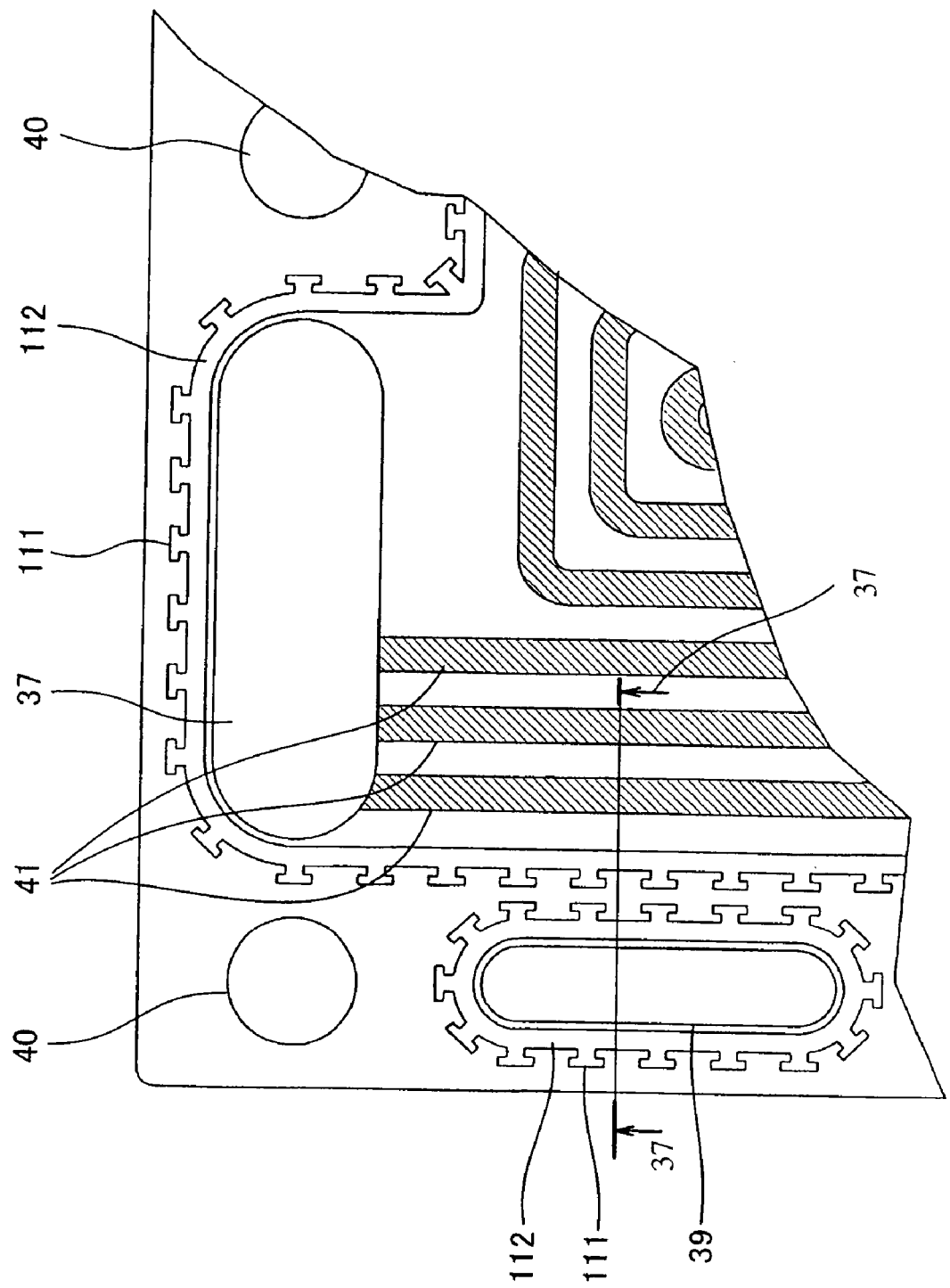
FIG. 36 is a plan view showing a portion of the cathode separator that is clamped to the face of the cathode side of the frame of the polymer membrane type fuel cell according to Example 3 of the present invention.
Figure 37:
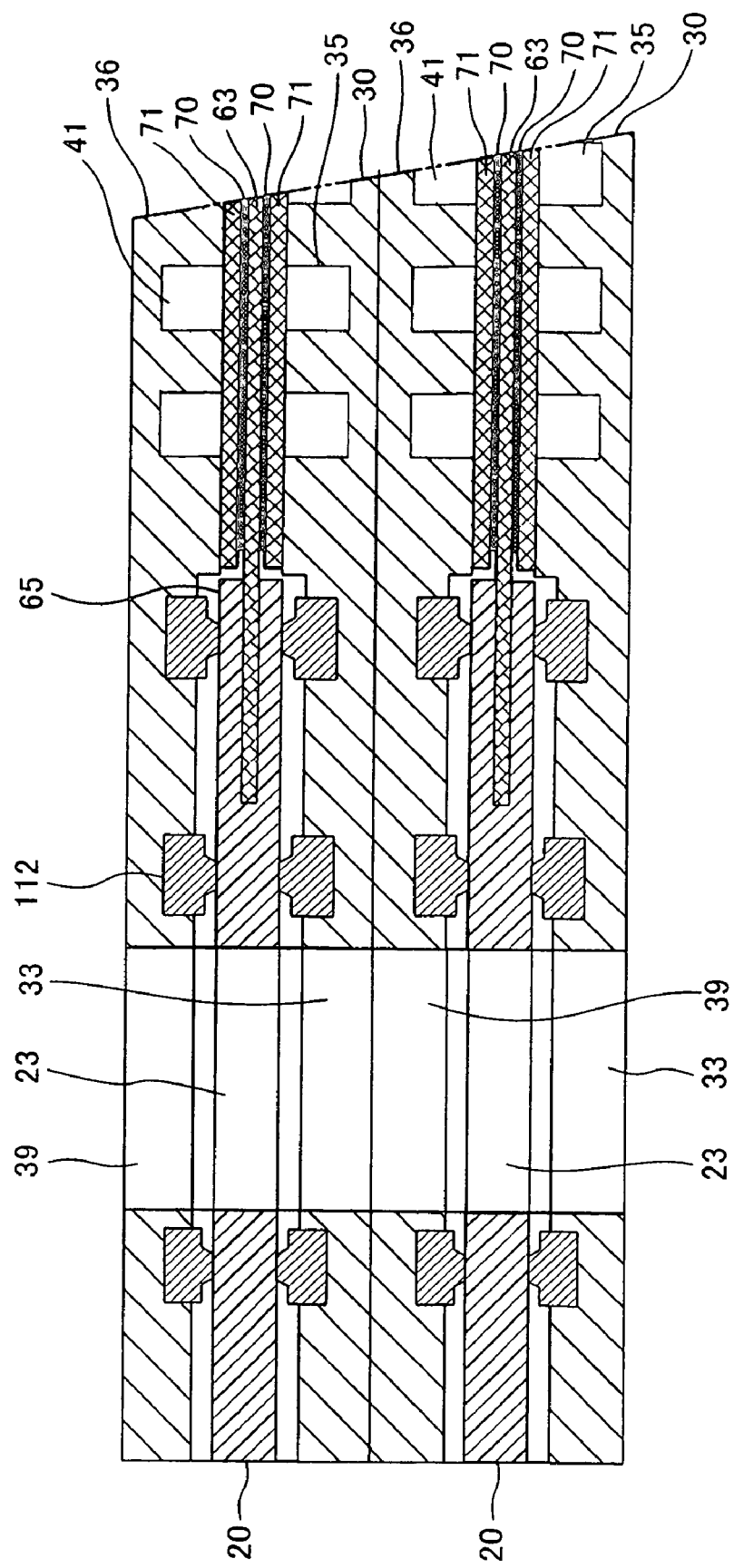
FIG. 37 is a partial cross sectional view showing a deformation in the proximity of the water manifold in the polymer membrane type fuel cell according to Example 3.

FIG. 36 is a plan view which shows the relevant parts of the cathode separator that is clamped to the cathode side of the frame of the polymer membrane type fuel cell according to the third embodiment of the present invention. FIG. 37 is a partial cross sectional view, similar to Example, which is shown in FIG. 17. The stack section of FIG. 37 is taken along line 37-37 of FIG. 36. The cooling water flow channels and sealing configuration of the cooling water surface, which are provided in anode separator 30 and cathode separator 36, has been omitted for FIG. 37, since these the same as in FIG. 17.

The hot press molded type separator (pre-production prototype of Nisshin Boseki Co., Ltd.), whose main ingredient is carbon powder and a phenolic thermosetting resin, has a plurality of latched grooves 111 in the sealing line as shown in FIG. 36. The elastomer blend, which contains fluorine elastomer (Pyton GDL, hardness Durometer of 55, made by Dupont-Dow Elastomers) as the main ingredient with a small amount of cross-linking agent added, was molded against both sides of the above-described molded object by heat transfer molding. The molding conditions were: first vulcanization at 180° C.×5 min and second vulcanization at 190° C.×8 hours.

The elastomeric member (112 in FIG. 36) is cross-linked by this heating process. It achieves elasticity, but simultaneously decreases the volume. Therefore, a satisfactory molded component cannot be obtained without providing latched grooves, because the elastomer (elastic body) separates from the separator due to the reduction in volume. In contrast, forming latched grooves 111 similar to this Example 3 makes it possible to produce good molded components in a high yield, because it can prevent the elastomeric member (elastic body) 112 from separating from the separator under the above-mentioned temperature conditions.

Twelve cells made by the above-described method were bonded with 1400 kg·f of bonding force via a bonding jig to assemble a 12-cell stack.

The present inventors conducted a conventional cross leakage test and limiting cross leakage test, the same as in Example 1, for assembly of a 12-cell stack.

The conventional leakage test resulted in 0 cc gas leakage from the cathode side, and the result of the limiting cross leakage test required a 428 kPa supply of source pressure to produce gas leakage from the cathode side.

FOURTH EMBODIMENT

The polymer membrane type fuel cell of the fourth embodiment is formed by insertion molding of the separator and unification with an elastic body, as described for the frame in Example 1. In other words, the elastic body is insertion molded using the frame, in which the membrane is already inserted, as an insertion part. This is a variation of the process of the frame insertion type, which uses a membrane as the insertion part, as described in Example 1.

The fourth through sixth embodiments postulate that the elastic body is a thermoplastic elastomer, because the application of heat for a cross-linking type elastomer, which is necessary for the second process, is difficult from the viewpoint of heat resistance of the frame and membrane, which have thermoplasticity. At the same time, it is possible to produce the most preferred configuration from the viewpoint of increasing reliability and yield percentage resulting from the prevention of separation, high chemical cleanliness, because a surface activator is not used for gluing the material which is not adherent, and excellent productivity because of the short process. This embodiment uses conventional thermoplastic ingredients in the frame, which is the insertion part, and a thermoplastic elastomer. The frame surface is melted and fused with the thermoplastic elastomer, and both are fusion bonded together after being cooled down. According to a narrow definition, this process is a two-step process. For example, when GFPP is used for the frame material, ideal two-step molding can be enabled by using TPO, which includes polypropylene for the hard segment. In the same way, when GFPA (glass-filled polyamide) was used as the frame material, polyamide group elastomers were accommodated.

EXAMPLE 4

Figure 22:
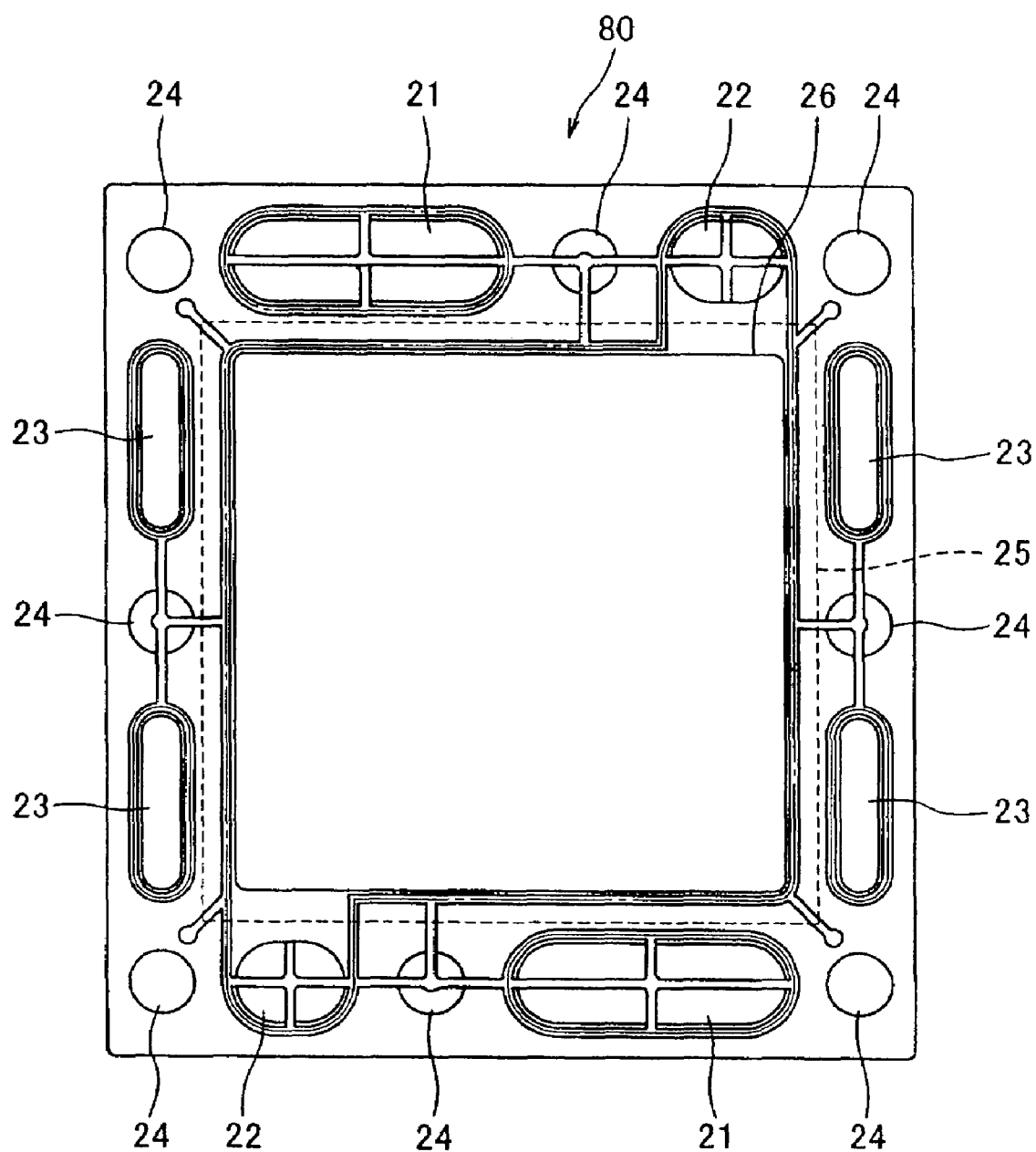
FIG. 22 is a plan view showing the anode side face configuration of the frame of the polymer membrane type fuel cell according to Example 4 of the present invention.
Figure 23:
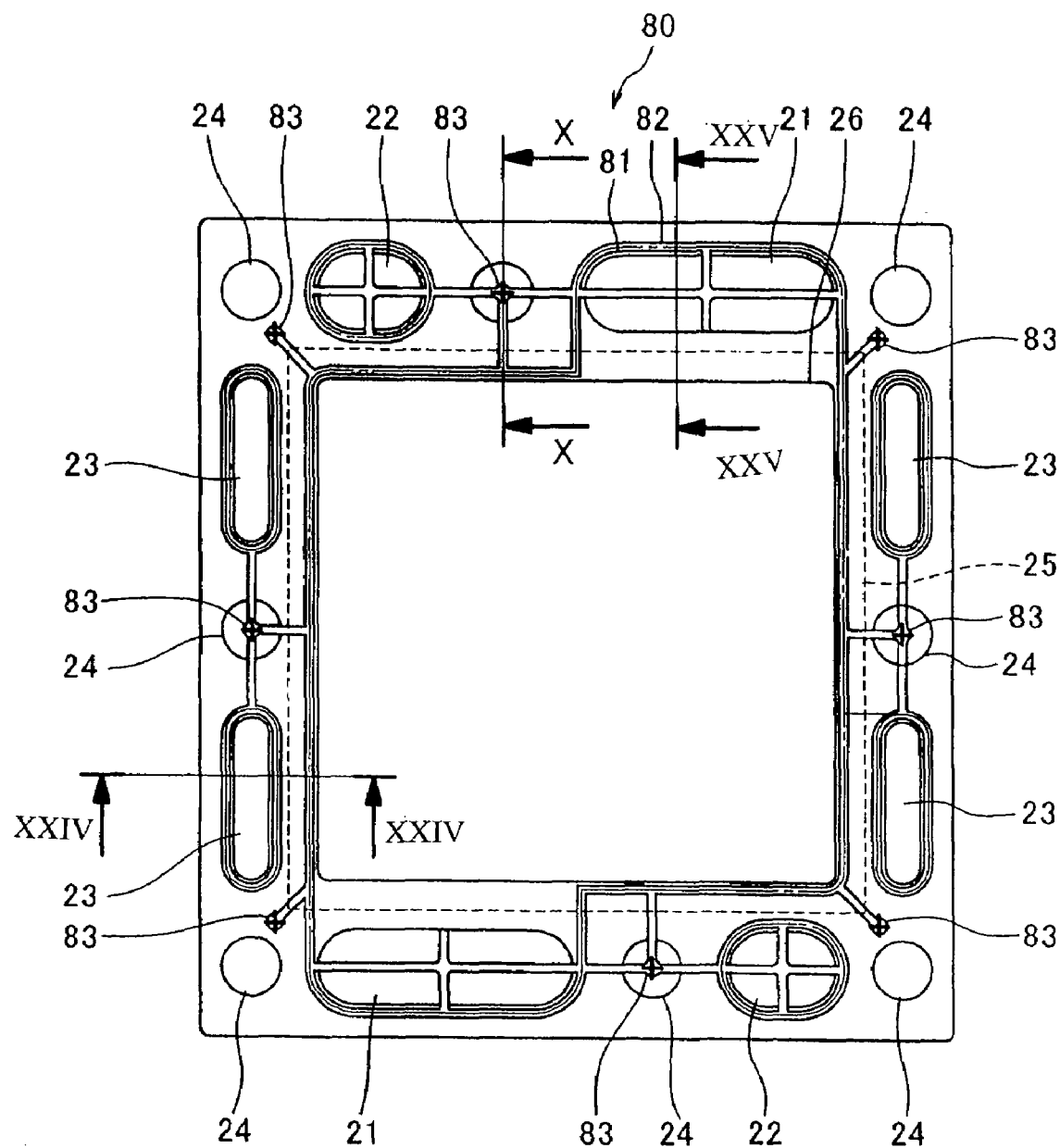
FIG. 23 is a plan view showing the cathode side face configuration of the frame of the polymer membrane type fuel cell according to Example 4.

FIG. 22 is a plan view of the anode side of the frame of the polymer membrane type fuel cell according Example 4. In the same way, FIG. 23 shows the cathode side of the frame. Because each manifold, bolt hole, etc. of Example 4 is the same as in Example 1, they are designated with the same reference numerals, and the description is omitted.

Figure 24:
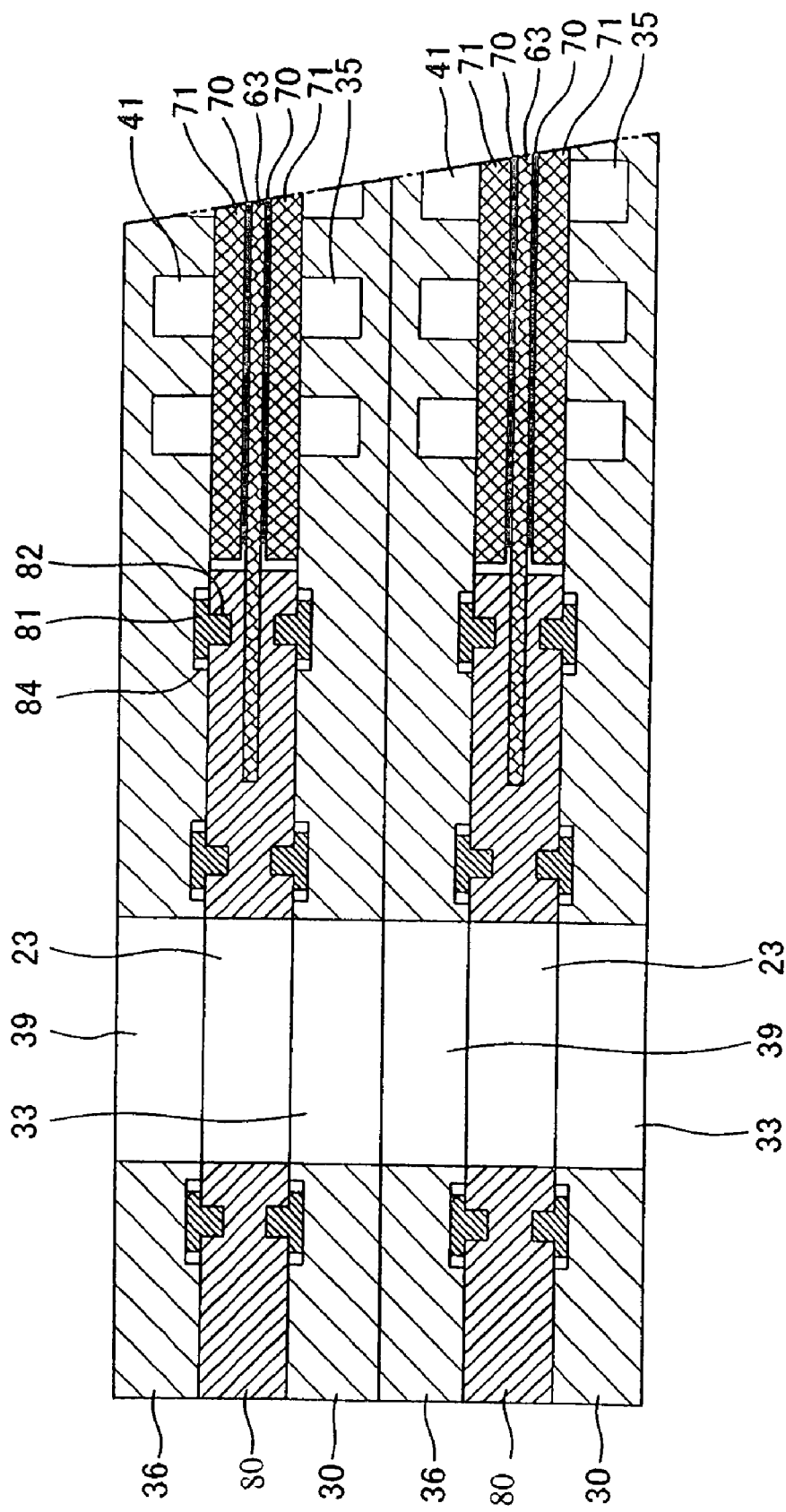
FIG. 24 is a partial cross sectional view along line XXIV-XXIV in FIG. 23 of the proximity of the water manifold in the polymer membrane type fuel cell according to Example 4.
Figure 25:
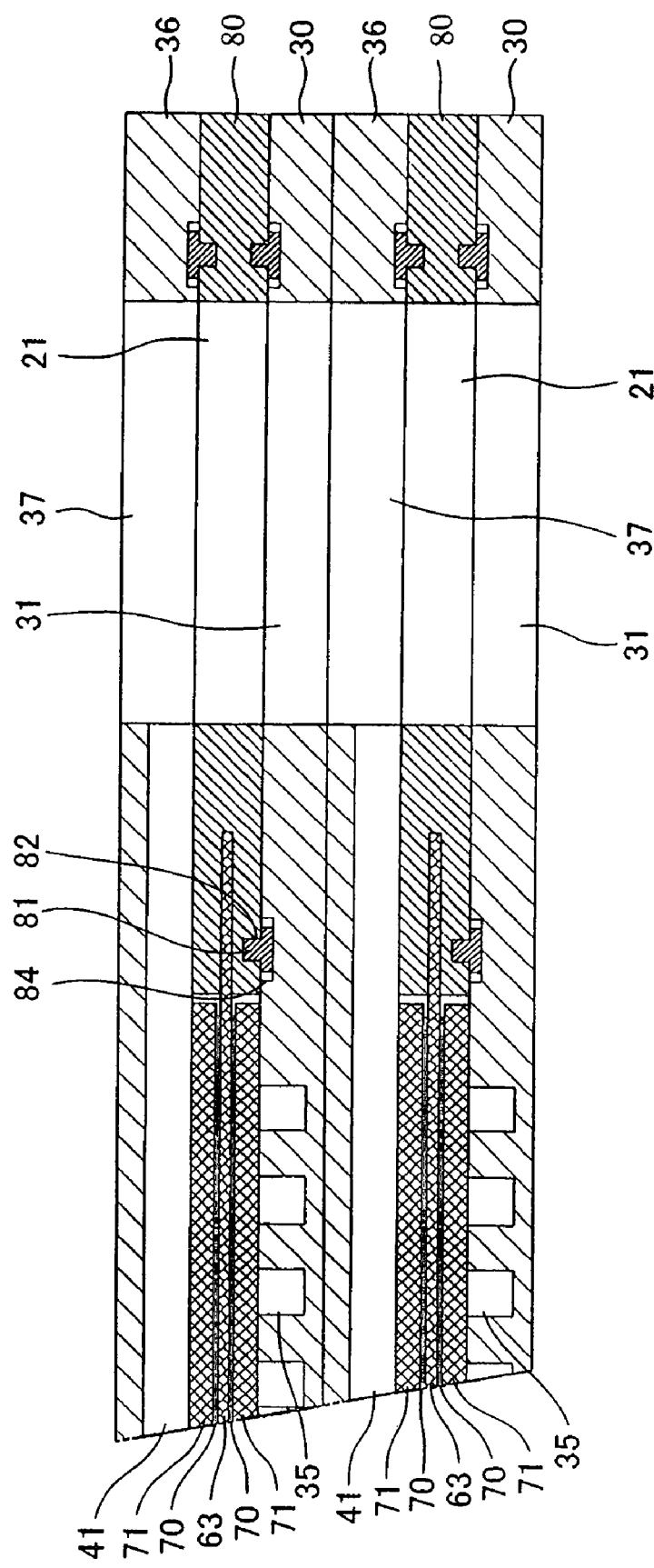
FIG. 25 is a partial cross sectional view along line XXV-XXV in FIG. 23 of the proximity of the air manifold in the polymer membrane type fuel cell according to Example 4.

Grooves 82 are formed around the air manifold 21, hydrogen manifold 22, water manifold 23, bolt hole 24, and aperture 26 of frame 80. As shown in FIGS. 22 and 23, elastic body 81, which functions as a sealing member, is inserted into groove 82. Reference numeral 83 in the Figures indicates a gate, which is used for elastic body 81 and runs down into groove 82. FIG. 24 is a cross sectional view, which shows the proximity of the water manifold 23, 33, 39 of the polymer membrane type fuel cell of Example 4. FIGS. 24 and 25 are cross-sections showing a portion of the stack along lines 24-24 and 25-25, respectively, of FIG. 23. The cooling water flow channels and sealing configuration of the cooling water surface, which are provided in anode separator 30 and cathode separator 36, are omitted in FIGS. 24 and 25, as a matter of clarity. However, the sealing configuration of the cooling water channels and the cooling water surface sealing configuration is conventional in the art.

As FIGS. 24 and 25 show, grooves 82 are formed in the appropriate locations on both sides of frame 80. Grooves 84, which are wider than grooves 82, are formed on the faces of the anode separator 30 and the cathode separator 36 which contact frame 80, in the locations which correspond to grooves 82. The elastic bodies 81 are arranged in the areas between grooves 82 and grooves 84, respectively.

Furthermore, the production method for the fuel cell according to this Example uses concave portions as described above.

The basic process of producing the planar cell, the materials and size of the polymer membrane, the use of the molding machine, the insertion process, the method of coating for the catalyst layer, the materials of the separator, and general processing method are the same as in Example 1, and for this reason explanations of these have been omitted.

The same processing used in Example 1 was conducted on polymer membrane 63, forming a frame 80 of standard thickness 1.4 mm using glass fiber-filled polypropylene (R250G made by Idemitsu Oil and Chemical Co., Ltd.). This processing also provided grooves 82 of 2.0 mm width and 0.3 mm depth in the first of the two molding steps. Continuously after the frame was removed from the dies, the frame was transferred to the other molding machine, and the filiform elastic body 81, with a 0.6 mm thickness, was made with polypropylene elastomer (Santoplane 8181-55, made by Santoplane Japan Co., Ltd.). Moreover, in this case, molding from one side to both sides was made possible by using the manifold and the bolt hole. Although the mold shrinkage factor of this elastic body 81 was 15/1000, the first molding (frame) and the second molding (elastic body) were tightly fusion bonded, and no separation or other such problems from mold shrinkage in the second step were observed.

Any unnecessary parts were cut off according to the T-shape, and the 12-cell stack was assembled in the same manner as Example 1.

The present inventors conducted a conventional cross leakage test and a limiting cross leakage test, which were the same as in Example 1, for the 12-cell stack of this Example.

The conventional leakage test resulted in 0 cc gas leakage from the cathode side, and the result of the limiting cross leakage test required 380 kPa supply of source pressure to produce gas leakage from the cathode side.

EXAMPLE 5

Example 5 illustrates a polymer membrane type fuel cell, which is made by a two-step molding process, which is different from Example 4.

Figure 26:
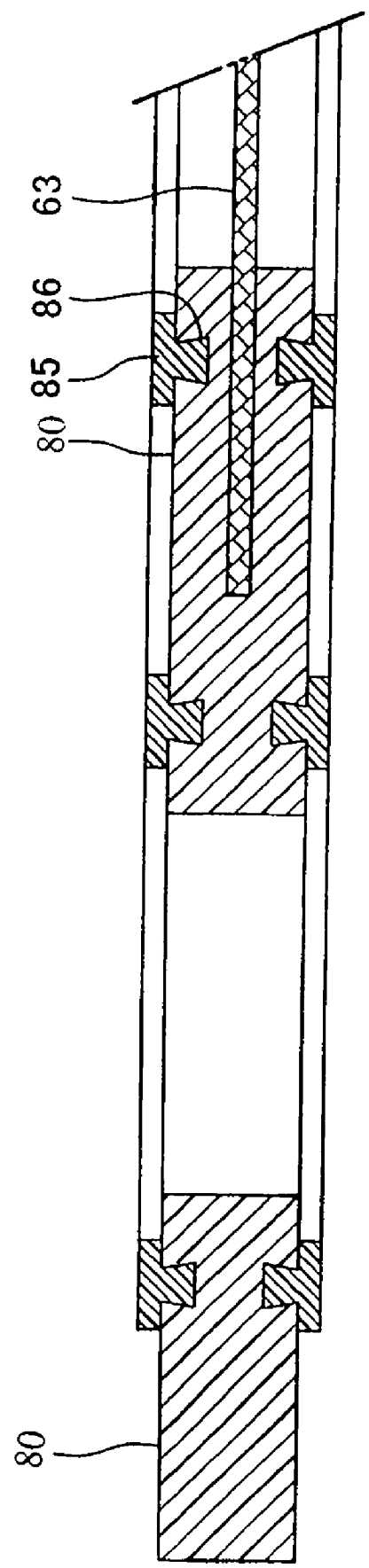
FIG. 26 is a partial cross sectional view showing the configuration of the frame of the polymer membrane type fuel cell according to Example 5.

FIG. 26 is a partial sectional view of the frame 80 of the polymer membrane type fuel cell of Example 5. Grooves 86, which have a tapered shape that expands toward the center of the frame thickness, are formed on frame 80, which holds the peripheral part of polymer membrane 63. In other words, grooves 86 are formed on frame 80 as undercuts. Although it is not shown diagrammatically, wider grooves than grooves 86 are formed in the corresponding locations of the separator plates 30, 36 which connect to frame 80. Elastic body 85 is arranged in the area which is created between the above-described grooves of the separator plates and grooves 86, respectively. More specifically, groove 86 is undercut and is filled with the elastic body.

In FIG. 26, as a matter of clarity, only polymer membrane 63 of the MEA is shown. The catalyst layer and the gas diffusion layer are omitted.

The basic process of producing the planar cell, the materials and size of the polymer membrane, the use of the molding machine, the insertion process, the method of coating for the catalyst layer, the materials of the separator, and general processing method are the same as in Example 1, and for this reason explanations of these have been omitted.

The same processing as in Example 1 was conducted on polymer membrane 63 to form frame 80 with a standard thickness of 1.4 mm using EPDM with the addition of PPS (DIC-PPS-2230, made by Dainihon Ink Co., Ltd.). This processing also provided groove 86 with a 2.0 mm width, a 0.3 mm depth, and a draft angle of minus 3.5° (reverse taper) in the first of the two molding steps. Although this material has only slight elasticity, it was possible to release the die setting without problems by using the above-mentioned draft angle. Continuously after removal from the dies, the frame was transferred to the other molding machine, and a filiform elastic body with a 0.6 mm thickness was made with polyolefin elastomer (Santoplane 8121-64-W233, made by Santoplane Japan Co., Ltd.). This material is a TPE, which is commonly called corner mold grade, which is used for a car window frame sealant. It shows especially good adhesion properties with EPDM. Frame 80, made with PPS, demonstrated that from a practical standpoint, peel-strength was also not a problem in PPS and TPT, whereas it was not expected for EPDM to exhibit adhesion properties because there is a tendency to delaminate.

Using a plastic alloy, which has a certain amount of elasticity, has advantages during the process of transference from the first step molded object to another die for the second molding step.

Although compression of approximately several dozen microns is preferred for the insertion clearance of the molding clamp of the first step, strict controls on the finished thickness of moldings from the first step mold are necessary, and clearance for the second step dies is also necessary, because highly rigid moldings are fragile. However, when an alloy was used for the frame, the yielding percentage improved, because these conditions were remedied and control became easier.

FIFTH EMBODIMENT

In the fourth embodiment the frame and elastic body have basically common component materials, and it is postulated that these two are fusion bonded by molding. When the frame and elastic body need a certain ability to flow, especially accompanied by a demand coming from a larger sized cell, the selection of the ideal materials as mentioned above might be impossible if we consider chemical stability and other such requirements. This fifth embodiment is devised to prevent problems, such as the separation of the frame and the elastic body.

Objectively, in the fifth embodiment, at first the polymer membrane is insertion molded with the frame material, and then the frame-membrane complex is mold coated with the elastic body material. Using this method, separation can be avoided, even though there are not any common ingredients between the frame and elastic body materials.

Figure 38:
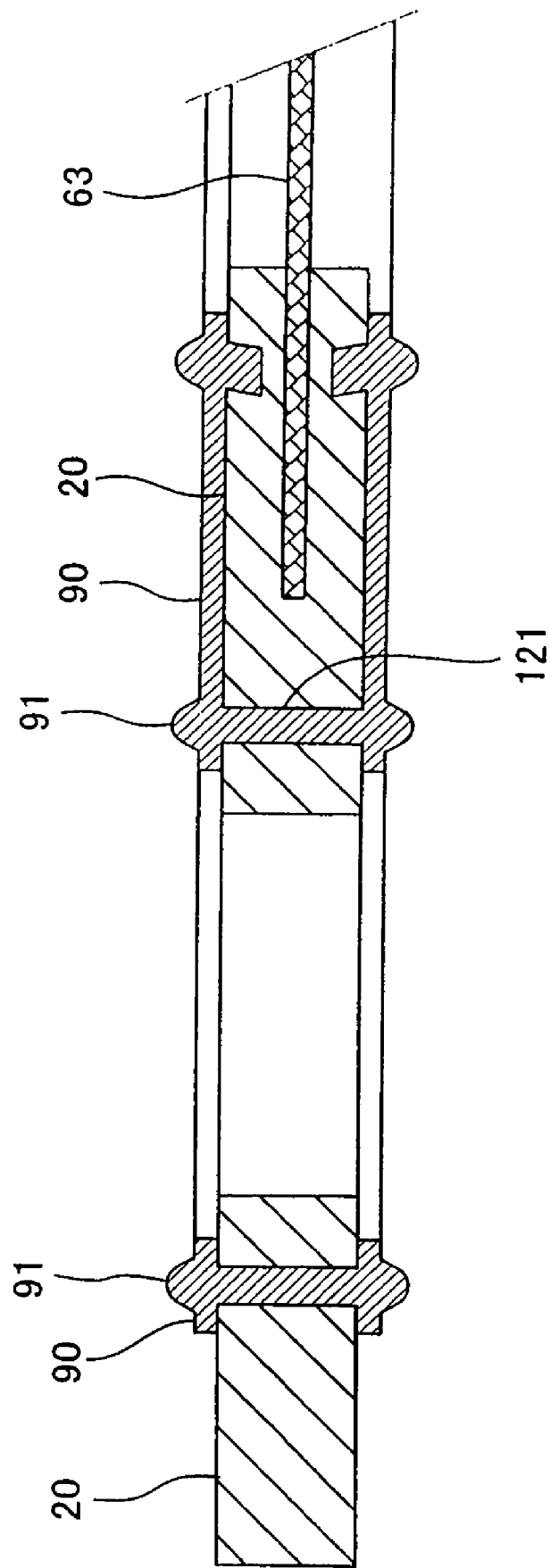
FIG. 38 is a partial cross sectional view showing the configuration of the frame of the polymer membrane type fuel cell according to Example 5 of the present invention.

For example, as described later, referring to FIGS. 27 and 28, the coating of the entire surface of the frame with the elastic body avoids the worry of separation, because the shrinkage in the mold dimensions of the second step resin keeps the entire frame shrunk. With the objective of preventing separation, penetrating-bore 121 is provided, which corresponds to the sealing line of the frame, as shown in FIG. 38. Moreover, both sides of elastic body 90, that is provided in the second step, are effectively connected via this penetrating-bore 121 (anchorage).

Figure 39:
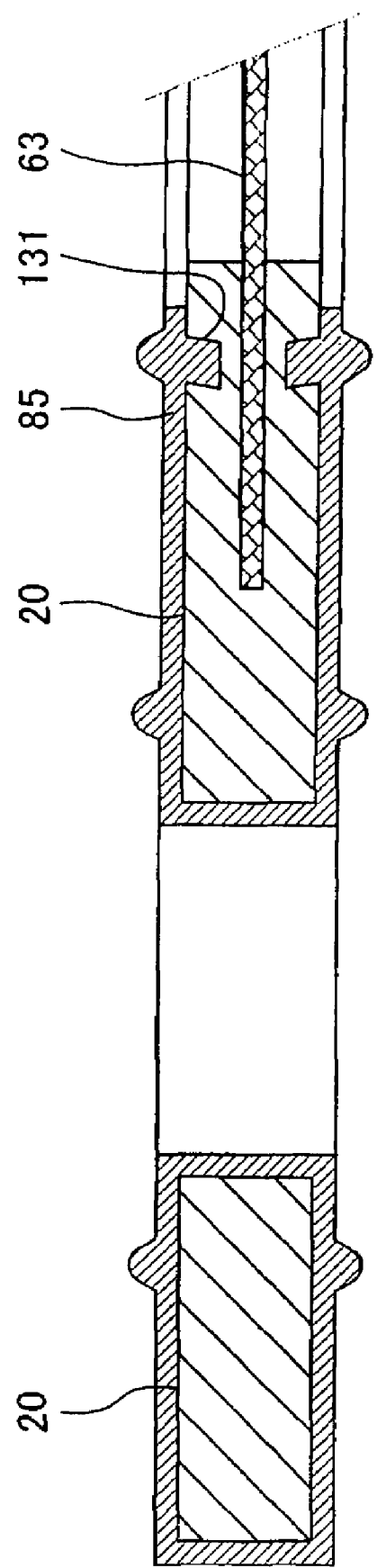
FIG. 39 is a partial cross sectional view showing the configuration of the frame of the polymer membrane type fuel cell according to Example 5.

Conducting the same method as described above, while referring to FIG. 26 in Example 5, can be accepted as a method for preventing the separation of the second step material by running this into a groove, which is provided with a reverse draft (undercut, draft angle is negative) 131 (refer to FIG. 39).

It is preferred to provide undercut 131 for preventing separation, because it is impossible for the above-described anchorage to provide for the part, which holds membrane 63 in the inner most part of frame 20. It is possible to form this easily using an angular pin in case of an undercut as shown in FIG. 39.

Proper design of the molding materials and dies can make possible two step moldings of materials which do not fusion bind with each other but without separation, based on the shape effect combined with the above-described coating, anchorage, and undercut.

EXAMPLE 6

Figure 27:
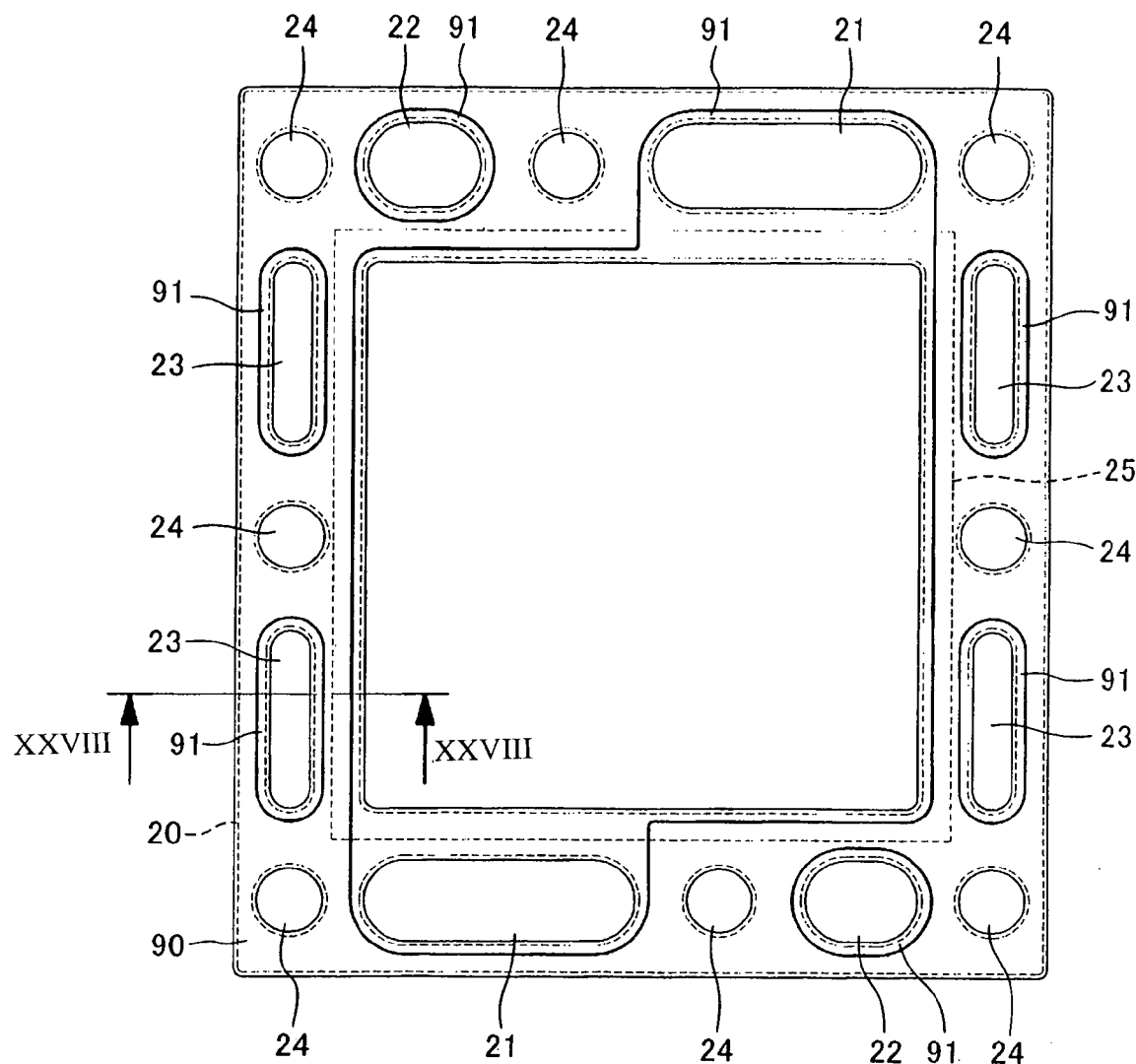
FIG. 27 is a plan view showing the configuration of the frame and the elastic body of the polymer membrane type fuel cell according to Example 6 of the present invention.

FIG. 27 is a plan view showing the configuration of the frame and the elastic body of the polymer membrane type fuel cell according to Example 6 of the present invention. FIG. 28 is the cross sectional view along line XXVIII-XXVIII of FIG. 27.

In Example 6, each manifold, bolt hole, etc. on the frame and the elastic body is provided with the same reference numeral as in Example 1, and for this reason explanations of these have been omitted (as a matter of clarity, the reference numeral for each manifold and bolt hole is written on the frame only).

Figure 28:
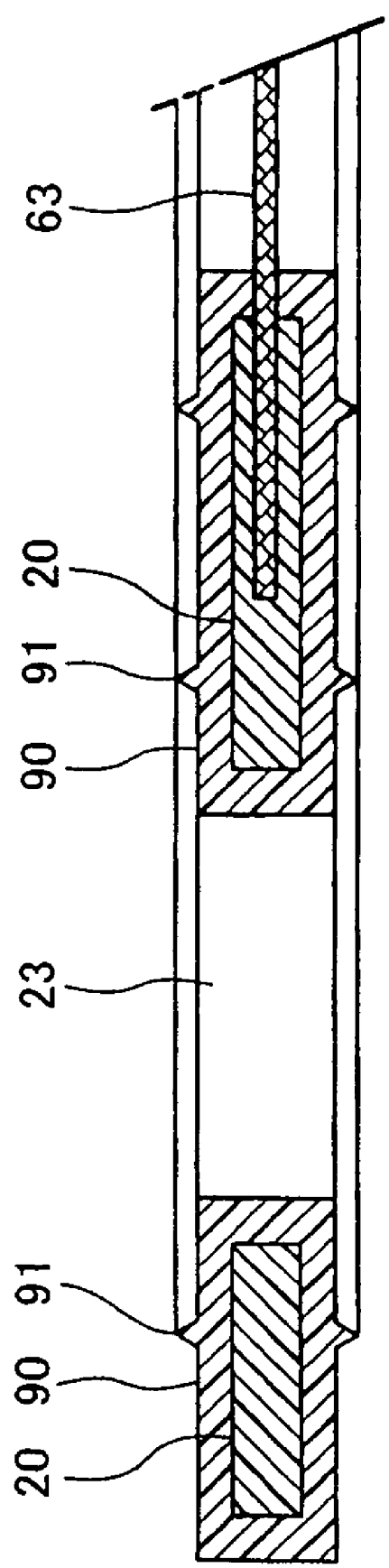
FIG. 28 is a cross sectional view along line XXVIII-XXVIII of FIG. 27.

Elastic body 90 is provided as a covering for the entire surface of frame 20, which tightly holds the peripheral part of polymer membrane 63 as shown in FIGS. 27 and 28. Beads 91, which are similar to the beads formed on the frame 20 in Example 1, are formed on elastic body 90. Only polymer membrane 63 of MEA 25 is shown, and the catalyst layers and the gas diffusion layers are omitted in FIG. 28, for the sake of clarity.

In this Example, a glass-filled PPS (DIC-PPS FZ1140-B2, made by Dainihon Ink Co., Ltd.) was used for the material of the first step, which became frame 20, and polyolefin elastomer (Santoplane 8101-55, made by Santoplane Japan Co., Ltd.) was used for the material of the second step, which became elastic body 90. The radial thickness of the frame was set as 0.75 mm, the standard radial thickness of the elastic body was set as 0.25 mm, and the height of beads 91, which are provided on both sides of the elastic body 90, was set as 0.2 mm.

The technique for the flow coating on both sides of the frame, from the base point of the end surface of the manifold, was used through the sub-runner from the center of each manifold using the same technique as Example 2. The item(s) shown in FIGS. 27 and 28 are depicted after any unnecessary parts have been cut off.

PPS and polyolefin are materials not capable of being fusion-bonded. Consequently, separation of the second step coating cannot be avoided if conventional PPS is used for the frame, as in Example 2. However, separation of the frame from the elastic body, and other problems, were not observed because of the configuration of the frame being coated by the elastic body in this Example.

A stack of this Example was assembled just as in Example 1. The inventors conducted a conventional cross leakage test and a limiting cross leakage test, just the same as in Example 1.

The cross leakage test resulted in an amount of 0 cc gas leakage from the cathode side, and the result of the limiting cross leakage test required 475 kPa of supply source pressure to produce gas leakage from the cathode side. As these results indicate, a high sealing effect was confirmed in this Example.

SIXTH EMBODIMENT

The sixth embodiment uses the insertion part method, wherein the insertion is molded in one step. The polymer membrane is held tightly by a pair of frames, which are different pieces, which is much different from the fourth and fifth embodiments. This construction method is effective when the resin, which is applied to the frame, does not have double molding capability. It is also used when using the frame material and the insertion molding of the polymer membrane becomes difficult, because the temperature of the requisite dies surpasses the tolerance level for the insertion molding of the polymer membrane (commonly it is conducted below 130° C. of die temperature). More specifically, this method is effective when one wants to elevate the die temperature, especially because of the thin-walled molding, or to use a material which easily shrinks afterwards. This technique is preferred because the range of material selection becomes wider. This construction method allows the use of a metal plate, ceramic plate, etc., because it does not restrict the frame material to resin alone. Consequently, the thin wall molding is difficult because the dimension of the frame becomes large accompanied with the growing size of the cell.

EXAMPLE 7

Figure 29:
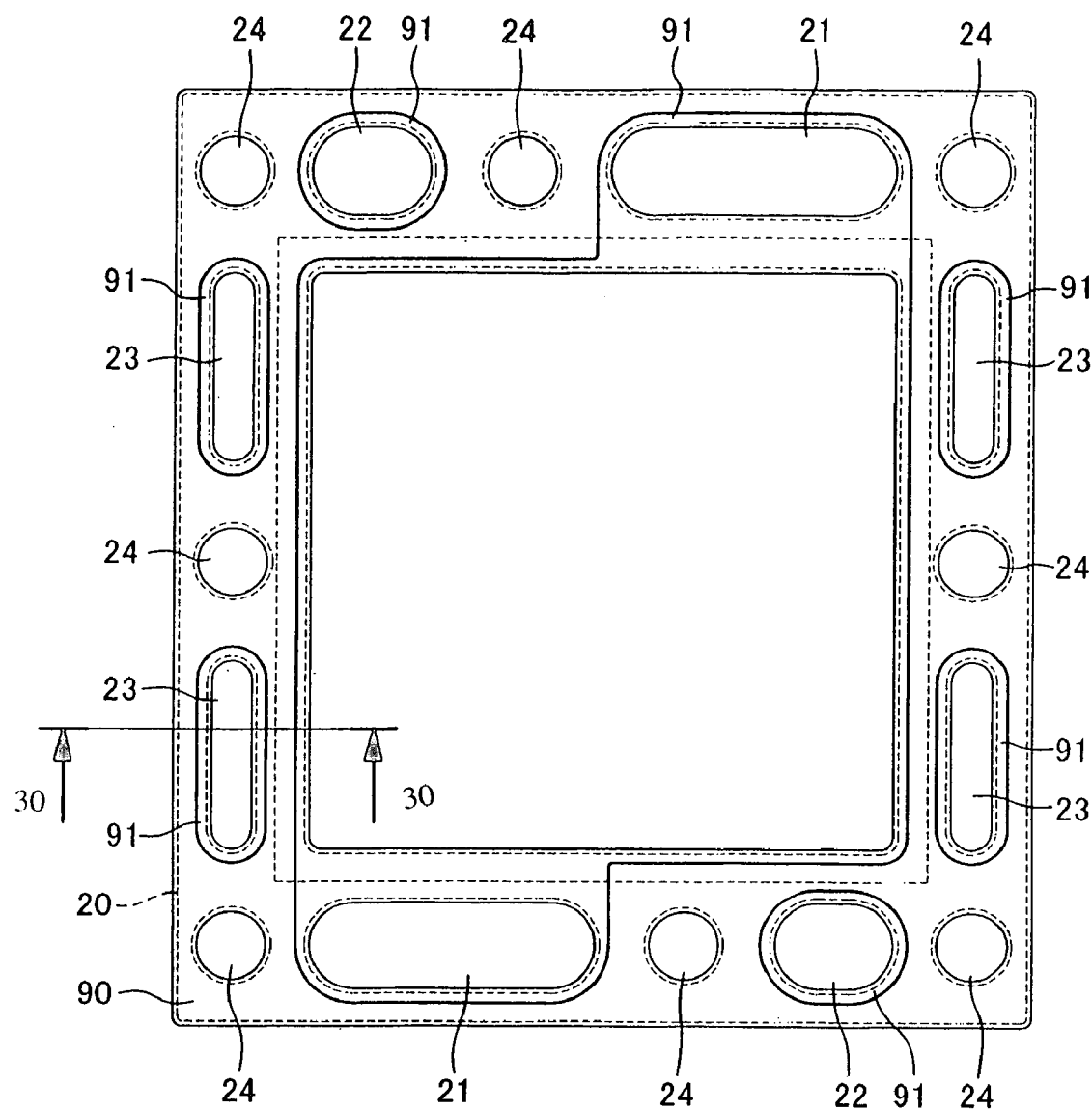
FIG. 29 is a plan view showing the configuration of the frame and the elastic body of the polymer membrane type fuel cell according to Example 7 of the present invention.
Figure 30:
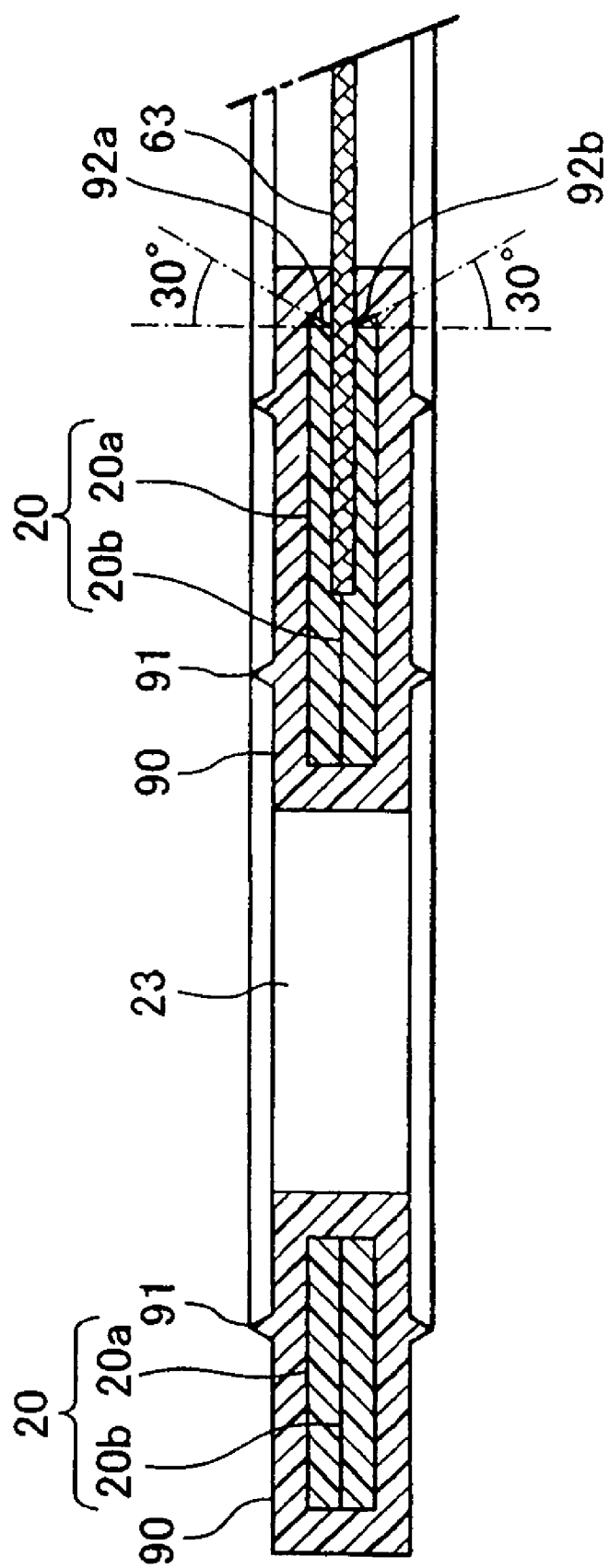
FIG. 30 is a cross sectional view along line 30-30 of FIG. 29.

FIG. 29 is a plan view showing the configuration of the frame and the elastic body of the polymer membrane type fuel cell according to Example 7 of the present invention. FIG. 30 is a cross sectional view along line 30-30 of FIG. 29.

In Example 7, each manifold, bolt hole, etc. on the frame and the elastic body is provided with the same reference numerals as in Example 1, and for this reason an explanation about these is omitted (as a matter of clarity, the manifold and bolt hole reference numerals are written on the frame only).

As shown in FIGS. 29 and 30, frame 20 is made with frame parts 20*a* and 20*b*, which are clamped under the surface. The peripheral part of polymer membrane 63 is held tightly by these frame parts 20a and 20b. Inclined part 92a, which has a predetermined angle directed upward (30° in FIG. 30) and spreading out, is provided in the end part of the holed side of the peripheral part of polymer membrane 63, i.e., the inside of frame part 20a as shown in FIG. 30. In the same way, inclined part 92b, which has a predetermined angle directed downward (30° in FIG. 30) and spreading out, is provided in the end part of the holed side of the peripheral part of polymer membrane 63, i.e., the inside of frame part 20b as shown in FIG. 30.

The elastic body 90 is provided to cover the entire surface of frame 20 just as in Example 6, and beads 91 are formed on this elastic body 90. Only polymer 63 of the MEA 25 is shown, and the catalyst layer and gas diffusion layer are omitted in FIG. 30 for the sake of clarity.

In this Example, glass-filled liquid crystal polymer (VECTRA® AI30 aromatic polyester liquid crystal, made by Polyplastics Co., Ltd., having an elastic modulus of 15,000 MPa) was used for the material of the first step, which became frame 20 (frame parts 20a and 20b), and polyolefin elastomer (Santoplane 8101-55, made by Santoplane Japan Co., Ltd.,) was used for the material of the second step, which became elastic body 90. The radial thickness of frame parts 20a and 20b is set at 0.25 mm each (in other words, the radial thickness of the entire frame 20 is 0.5 mm), the standard radial thickness of the elastic body is 0.25 mm, and the height of beads 90, which are provided on both sides of elastic body 90, is 0.2 mm.

The separation of the elastic body 90 and the frame 20 during the second molding step was completely prevented by the undercut, which is the declination aspect of 92a and 92b on the frame 20a and 20b, respectively, as mentioned above.

The technique for the flow coating on both sides of the frame, from the base point of the end surface of the manifold, was used through the sub-runner from the center of each manifold using the same technique as Example 2. The item(s) shown in FIGS. 29 and 30 are depicted after any unnecessary parts have been cut off.

The stack of this Example was assembled just as in Example 1. The inventors conducted a conventional leakage test and a limiting cross leakage test, in the same manner as conducted in Example 1.

The conventional leakage test resulted in an amount of 0 cc leakage of gas from the cathode side, and the result of the limiting cross leakage test required a 322 kPa supply of source pressure to produce gas leakage from the cathode side. A high degree of sealing effect was also confirmed in this Example, as the results indicate.

EXAMPLE 8

Although the glass-filled liquid crystal polymer was adopted for the first step material in Example 7, which became frame 20 as mentioned above, it is possible to adopt other materials. A conventional leakage test and a limiting cross leakage test were conducted in Example 8 using a metal board SUS316 of approximately 0.25 mm instead of the liquid crystal polymer as the frame 20, which was processed with a fluorine coating after press punching.

The conventional leakage test resulted in an amount of 0 cc leakage of gas from the cathode side, and the result of the limiting cross leakage test required a 785 kPa supply of source pressure to produce a gas leakage from the cathode side. A high sealing effect was also confirmed in this Example according to the results indicated.

SEVEVTH EMBODIMENT

In Examples 7 and 8 the necessary die temperature for molding the selected material may possibly be in a range which causes damage to the polymer membrane. The seventh embodiment considers such a case. Concretely speaking, the elastic body is molded by partial penetration (impregnation) or by coating the entire surface covering both faces of the separate piece type frame. The elastic body is sealed between the surrounding polymer membrane and the separator/gasket by the bonding force of the cells, thereby holding the peripheral part of the polymer membrane with the pair of elastic bodies. Consequently, each space between frame and separator, other frame and other separator, and frame to frame, is filled with an elastic body, respectively. The cell, which requires this configuration shape is to be made as a stack for co-generation, which requires longer operating than the operation of in-vehicle cells. A fluorinated elastomer (whose preferred die temperature is generally greater than 150° C.) is expected to be selected from the viewpoint of long-term stability. In this case, the superior engineering plastic grade of GF (glass fiber addition) is preferred, because mechanical strength (especially the elastic modulus) is absolutely necessary from the viewpoint of preventing drooping of the elastic body.

EXAMPLE 9

Figure 31:
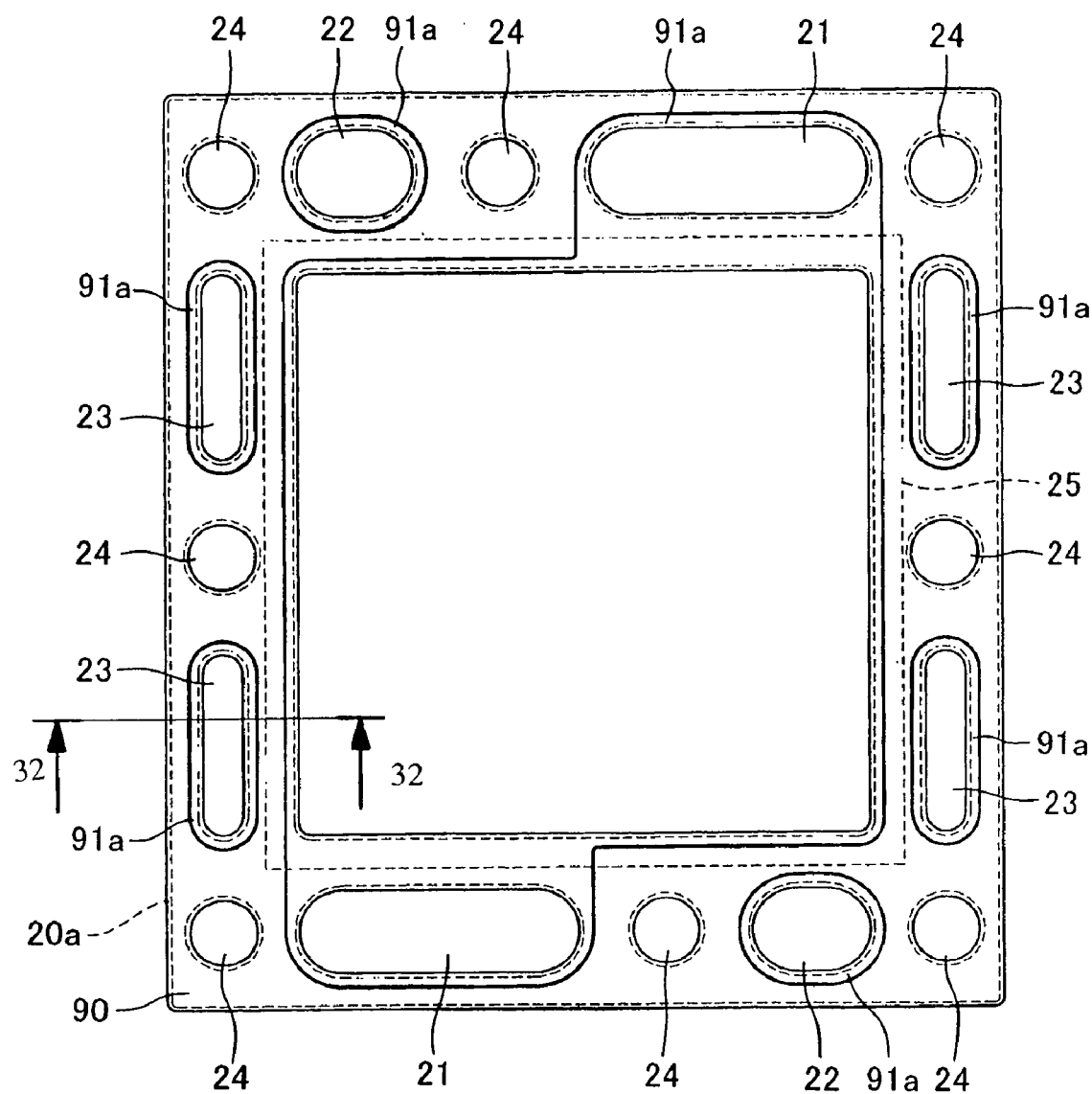
FIG. 31 is a plan view showing the configuration of the frame and the plastic body of the polymer membrane type fuel cell according to Example 9 of the present invention.
Figure 32:
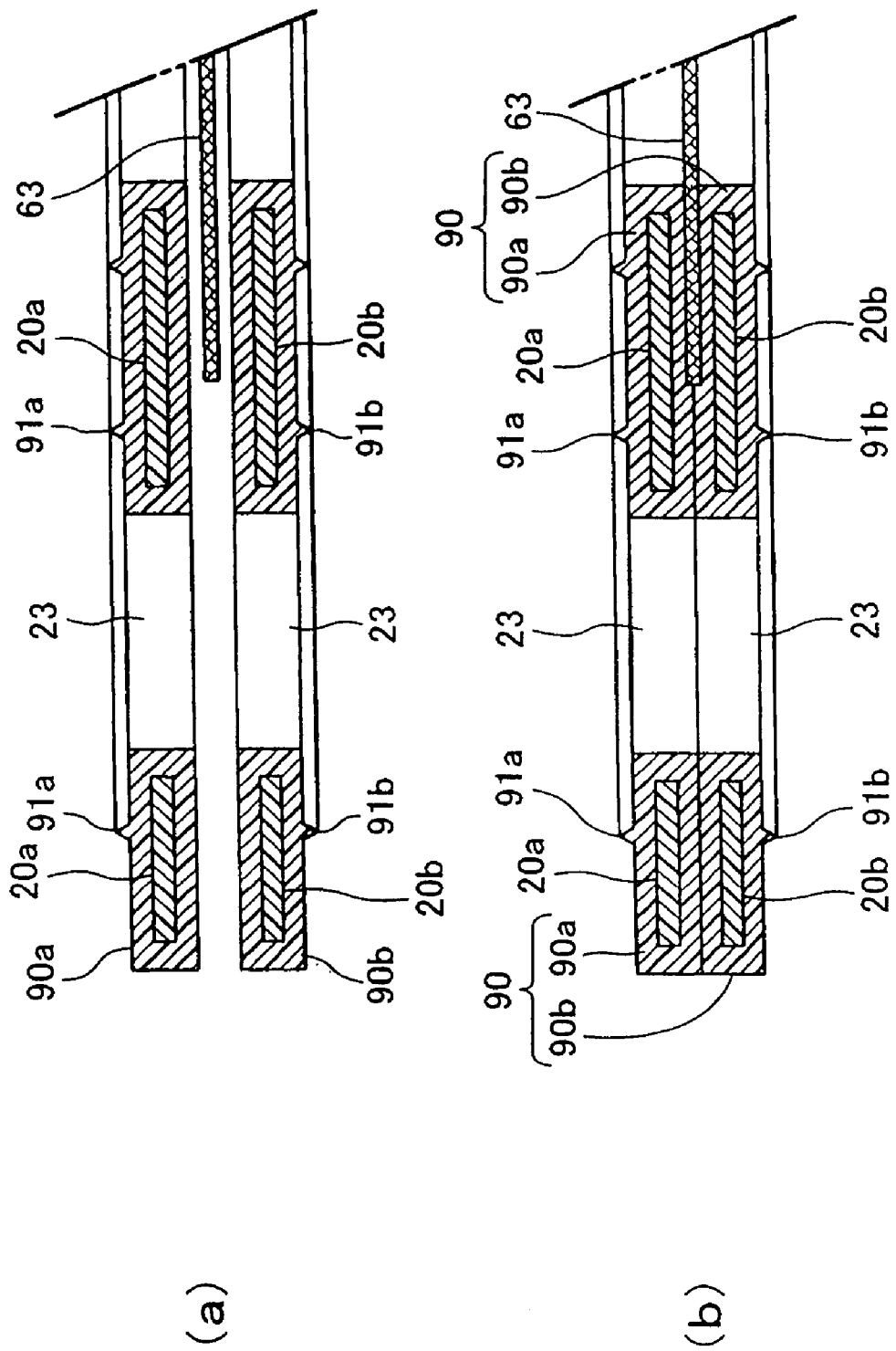
FIGS. 32(a) and (b) are cross sectional views along line 32-32 of FIG. 31, with views (a) and (b) showing the assembly process of the aforementioned configuration.

FIG. 31 is a plan view showing the relevant parts of the frame and the elastic body of a polymer membrane type fuel cell according to Example 9. FIG. 32 is a cross-sectional view along line 32-32 of FIG. 31, with views (a) and (b) illustrating the process of assembling the aforementioned configuration. In Example 9, each manifold, bolt holes, etc. on the frame and the elastic body is provided with the same reference numeral as in Example 1, and for this reason the explanation of these is omitted (for clarity, the reference numeral for each manifold is written on the frame only).

The frame and the elastic body of this Example are double structured, as shown in FIGS. 32(a) and (b). Concave portions are formed upon assembly of elastic body 90a, which is provided to cover the entire frame 20a, and elastic body 90b, which is provided to cover the entire frame 20b. Beads 91a and 91b, which are similar to the beads provided on the frame of Example 1, are formed on elastic body 90a and 90b, respectively. The peripheral part of polymer membrane 63 is held tightly by the elastic bodies 90a and 90b in the concave portions. In FIG. 32(a) and (b), as a matter of clarity, only polymer membrane 63 of the MEA 25 is shown, and the catalyst layer and the gas diffusion layer are omitted.

In this Example, frames 20a and 20b were made with glass-filled liquid crystal polymer (VECTRA® BI30 aromatic polyester liquid crystal made by Polyplastics Co., Ltd., having an elastic modulus of 20,000 MPa) as the first step material using an injection-molding machine for the thermoplastic resin. In the second step (elastic bodies 90a and 90b) fluorine elastomer (Python AP made by Dupont Dow Elastomers Japan Co., Ltd., 55 Durometer rubber hardness) was molded by use of an injection-molding machine for thermoplastic resin.

The radial thickness of frames 20a and 20b was set as 0.25 mm, the standard radial thickness of elastic bodies 90a and 90b was set as 0.25 mm (i.e., the radial thickness of frame 90 is 0.5 mm), and the heights of the beads 91a and 91b, which are provided on both sides of the elastic body 90a and 90b, are 0.2 mm, respectively.

Although the first vulcanization in the second step was performed at a temperature of 170° C. for 4 minutes, and the second vulcanization was performed at a temperature of 180° C. for 8 hours, frames 20a and frame 20b did not show any deformation caused by heat under these thermal conditions.

The sealing part material, which was made as described above, was used to tightly hold the MEA (Japan Goatex Primair), which had been hot pressed. It was then bonded just as in Example 1 to assemble a 12-cell stack. The inventors conducted a conventional leakage test and a limiting cross leakage test just as in Example 1.

The conventional leakage test resulted in an amount of 0 cc leakage of gas from the cathode side, and the result of the limiting cross leakage test required a 268 kPa supply of source pressure to produce gas leakage from the cathode side. The high sealing effect was also confirmed in this Example according to these results.

EXAMPLE 10

Figure 33:
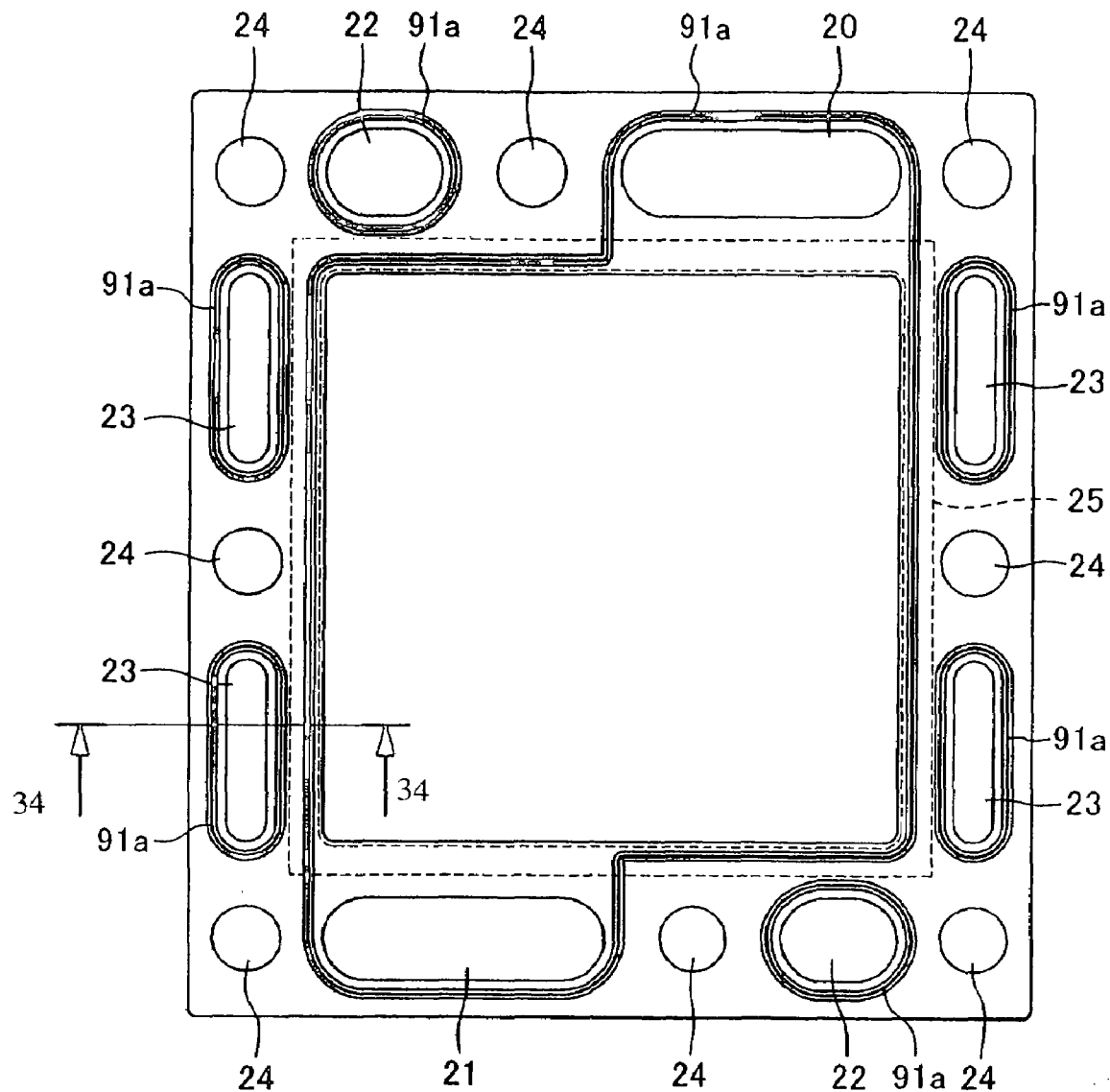
FIG. 33 is a plan view showing the configuration of a deformation of the frame and the elastic body of the polymer membrane type fuel cell according to Example 10 of the present invention.
Figure 34:
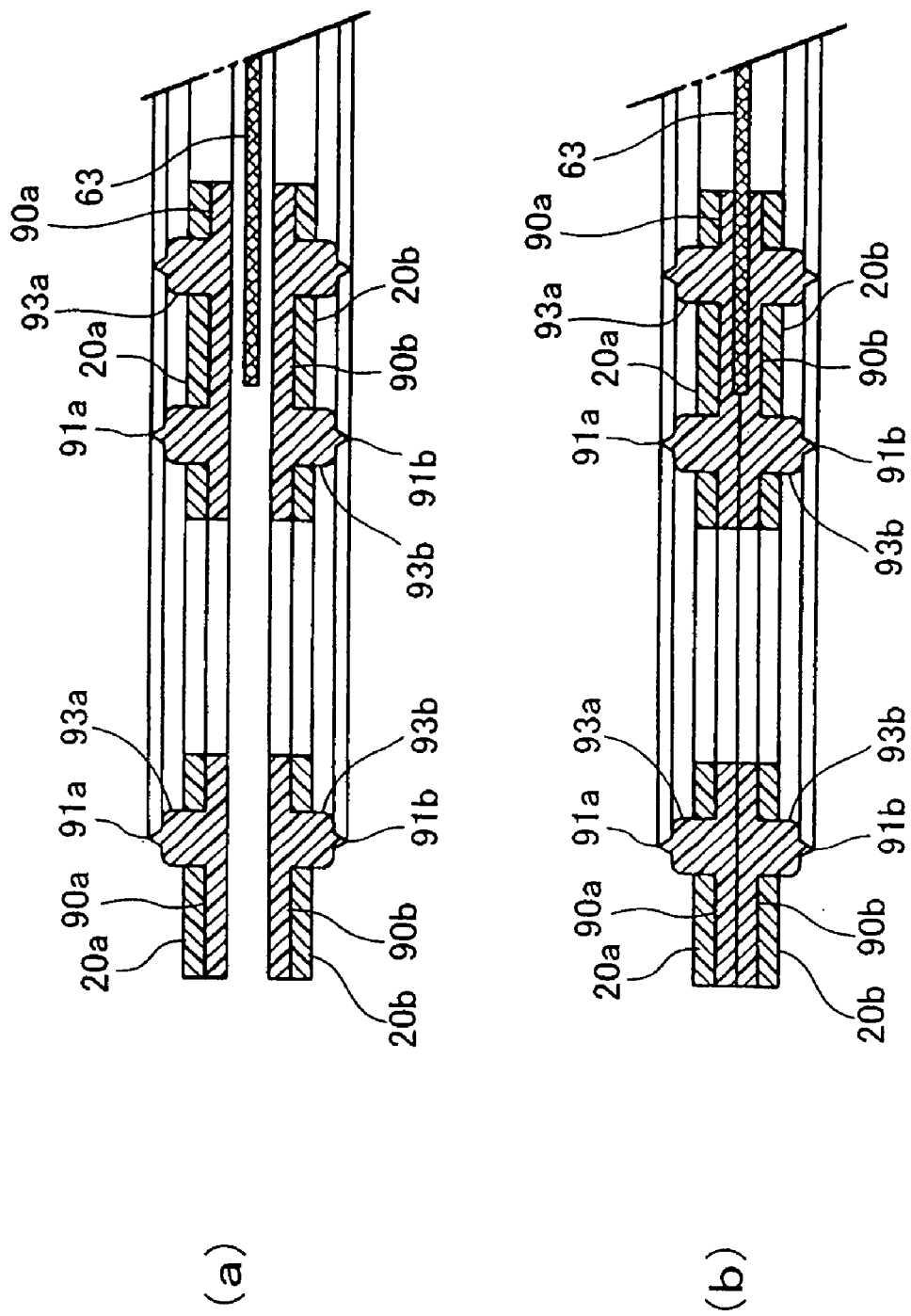
FIGS. 34(a) and (b) are cross sectional views along line 34-34 of FIG. 33, with views (a) and (b) showing the assembly process of the aforementioned configuration.

The configuration shown in FIGS. 33 and 34 is a modified sealing configuration according to the seventh embodiment. FIG. 33 is a plan view showing a modified configuration of the frame and the elastic body of the polymer membrane type fuel cell according to Example 10 of the present invention. FIG. 34 is cross sectional view along line 34-34 of FIG. 33, with views (a) and (b) illustrating the procedure for assembly of the aforementioned configuration.

Elastic bodies 90a and 90b are covered by frames 20a and 20b, respectively, as shown in FIGS. 33 and 34. Beads 91a are formed on lips 93a, which project outwardly and upwardly, penetrating frame body 20a and being formed on the elastic body 90a.

In this modified Example, frames 20a and 20b were made with a glass-filled liquid crystal polymer (VECTRA® BI30 aromatic polyester liquid crystal, made by Polyplastics Co., Ltd., elastic modulus of 20,000 MPa). The second step (elastic bodies 90a and 90b) fluorine elastomer (Python AP, made by Dupont Dow Elastomers Japan Co., Ltd., 55 Durometer rubber hardness) was molded using an injection-molding machine for the thermoplastic resin.

The radial thickness of frames 20a and 20b was set as 0.25 mm, the radial thickness of elastic bodies 90a and 90b was set as 0.25 mm, the widths of lips 93a and 93b are 0.2 mm, and the heights of 90a and 90b are 0.2 mm, respectively.

The first vulcanization in the second step was conducted at a temperature of 170° C. for 4 minutes, and the second vulcanization was conducted at a temperature of 180° C. for 8 hours.

The sealing part material, which was created as described above, was used to tightly hold the MEA (Japan Goatex Primair), which had been hot pressed. This was then bonded just as in Example 1 to assemble a 12-cell stack. The inventors conducted a conventional cross leakage test and a limiting cross leakage test just as in Example 1.

The conventional cross leakage test resulted in an amount of 0 cc leakage of gas from the cathode side, and the results of the limiting cross leakage test required a 332 kPa supply of source pressure to produce gas leakage from the cathode side. The high sealing effect was also confirmed in this Example according to the results indicated.

Achievement of low cost production was accomplished because the quantity of expensive fluorine elastomer was decreased by half in this Example, compared to that of Example 9.

The polymer membrane type fuel cell, exemplified in the various embodiments described above, is selected according to the size of the cell, the mold shrinkage factor of the resin, the total processing cost, the conditions of cell operation (especially loss of pressure of flow channels and pressure difference between the two electrodes), allowable cell pitch, and possible thickness of the molded parts, etc.

In addition, although the polymer membrane type fuel cell is described in various embodiments as described above, the present invention is not limited even to a polymer membrane type fuel cell. Currently, a low temperature (less than 100° C.) fuel cell, which operates using materials other than glass, ceramic, etc. for the electrolyte being developed. Both the frame, which has thermoplasticity, and the elastic body, which shows compressive strain under high temperature, are basically chosen by an appropriate selection under the above-described temperature conditions. Consequently, it is possible to apply the present invention to such a low temperature fuel cell.

INDUSTRIAL APPLICABILITY

The configuration of the membrane for the fuel cell, the configuration of the membrane electrode assembly for the fuel cell, and the fuel cell providing the configuration of the membrane electrode assembly are useful for high-precision polymer membrane type fuel cells, etc. because these can be reliably and easily sealed between the separators and between the separator and the membrane for the fuel cell.

It will be appreciated by those skilled in the art that changes could be made to the Examples described above without departing from the broad inventive concept thereof. It is understood, therefore, that this invention is not limited to the particular Examples disclosed, but it is intended to cover modifications within the spirit and scope of the present invention as defined by the appended claims.

We claim:

1. An electrolyte membrane element for use in a fuel cell in which the membrane is sandwiched between a pair of electrode layers to form a membrane electrode assembly and the membrane electrode assembly is held tightly between a pair of separators each having a gas flow channel facing the membrane electrode assembly, the electrolyte membrane element comprising an electrolyte membrane having peripheral portions tightly held by a frame having an elastic modulus of greater than about 2000 MPa and less than about 2,000,000 MPa and at least one elastic body having an elastic modulus of greater than 0 MPa and less than about 200 MPa, the frame and the elastic body being configured to provide fluid-tight seals between the membrane peripheral portions and the respective separators.

2. A membrane electrode assembly for a fuel cell in which the assembly is held tightly between a pair of separators each having a gas flow channel facing the membrane electrode assembly, the assembly comprising an electrolyte membrane element according to claim 1, wherein an area of the electrolyte membrane laterally surrounded by the frame is sandwiched between a pair of electrode layers, and wherein the at least one elastic body is not attached to the frame.

3. A membrane electrode assembly for a fuel cell in which the assembly is held tightly between a pair of separators each having a gas flow channel facing the membrane electrode assembly, the assembly comprising an electrolyte membrane element according to claim 1, wherein an area of the electrolyte membrane laterally surrounded by the frame is sandwiched between a pair of electrode layers, and wherein the at least one elastic body is attached to the frame.

4. The membrane electrode assembly according to claim 3, wherein the frame and the at least one elastic body form a unit.

5. The membrane electrode assembly according to claim 4, wherein the frame and the at least one elastic body are fusion bonded.

6. The membrane electrode assembly according to claim 4, wherein the at least one elastic body covers the entire surface of the frame.

7. The membrane electrode assembly according to claim 4, wherein the frame is anchored by the at least one elastic body.

8. The membrane electrode assembly according to claim 4, wherein the frame has at least one undercut portion and the at least one elastic body fills the undercut portion.

9. A fuel cell comprising an electrolyte membrane element according to claim 1 and a pair of electrode layers sandwiching an area of the electrolyte membrane laterally surrounded by the frame to form a membrane electrode assembly, and a pair of separators each having a gas flow channel facing the membrane, and tightly holding the membrane electrode assembly therebetween, such that the frame and the at least one elastic body provide fluid tight seals between the membrane and the respective separators.

10. The fuel cell according to claim 9, wherein each separator has at least one of the elastic bodies forming a unit therewith.

11. The fuel cell according to claim 9, wherein the frame and the at least one elastic body form a unit.

12. The fuel cell according to claim 11, wherein the frame and the at least one elastic body are fusion bonded.

13. The fuel cell according to claim 11, wherein at least one elastic body covers the entire surface of the frame.

14. The fuel cell according to claim 11, wherein where the frame is anchored by the at least one elastic body.

15. The fuel cell according to claim 11, wherein the frame has at least one undercut portion, and the at least one elastic body fills the undercut portion.

16. A fuel cell comprising an electrolyte membrane having peripheral portions tightly held by a frame having an elastic modulus of greater than about 200 MPa and less than about 2,000,000 MPa and a pair of electrode layers sandwiching an area of the electrolyte membrane laterally surrounded by the frame to form a membrane electrode assembly, and a pair of separators each having a gas flow channel facing the membrane and tightly holding the membrane electrode assembly therebetween, at least portions of the separators having an elastic modulus greater than 0 MPa and less than about 200 MPa, the frame and the separators being configured to provide fluid-tight seals between the membrane peripheral portions and the respective separators.

17. A fuel cell comprising an electrolyte membrane having peripheral portions, a pair of electrode layers sandwiching an area of the electrolyte membrane laterally surrounded by the peripheral portions to form a membrane electrode assembly, a pair of separators for holding membrane electrode assembly tightly and each having a gas flow channel facing the membrane, and a seal configuration for forming fluid tight seals between the membrane peripheral portions and the respective separators, wherein the seal configuration comprises first and second frames having an elastic modulus of greater than 2000 MPa and less than 2,000,000 MPa and the first and second frames lying on opposite sides of the electrolyte membrane in a region of the peripheral portions, and at least one elastic body arranged between the first and second frames and between the frames and the respective separators and contacting the peripheral portions.

18. The fuel cell according to claim 17, wherein the at least one elastic body covers entire surfaces of the first and second frames.

* * * * *